(12) United States Patent
McBride

(10) Patent No.: US 7,984,126 B2
(45) Date of Patent: Jul. 19, 2011

(54) EXECUTABLE APPLICATION NETWORK IMPACT AND LOAD CHARACTERISTIC ESTIMATION SYSTEM

(75) Inventor: Edmund Joseph McBride, Landsale, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 2870 days.

(21) Appl. No.: 10/349,054

(22) Filed: Jan. 22, 2003

(65) Prior Publication Data
US 2003/0158930 A1 Aug. 21, 2003

Related U.S. Application Data

(60) Provisional application No. 60/351,042, filed on Jan. 22, 2002, provisional application No. 60/366,507, filed on Mar. 21, 2002.

(51) Int. Cl.
*G06F 15/173* (2006.01)
*G06F 9/44* (2006.01)
*G06F 11/00* (2006.01)

(52) U.S. Cl. .......................... 709/223; 717/100; 714/40

(58) Field of Classification Search .................. None
See application file for complete search history.

(56) References Cited

U.S. PATENT DOCUMENTS

| | | | | |
|---|---|---|---|---|
| 5,960,196 | A * | 9/1999 | Carrier et al. | 717/122 |
| 6,029,257 | A * | 2/2000 | Palmer | 714/40 |
| 6,061,725 | A | 5/2000 | Schwaller et al. | 709/224 |
| 6,086,618 | A * | 7/2000 | Al-Hilali et al. | 703/2 |
| 6,141,686 | A | 10/2000 | Jackowski et al. | 709/224 |
| 6,374,102 | B1 | 4/2002 | Brachman et al. | 455/422 |
| 6,381,628 | B1 | 4/2002 | Hunt | 709/201 |
| 6,381,735 | B1 | 4/2002 | Hunt | 717/4 |
| 6,446,028 | B1 | 9/2002 | Wang | 702/186 |
| 6,801,940 | B1 * | 10/2004 | Moran et al. | 709/224 |
| 2001/0034637 | A1 | 10/2001 | Lin et al. | 705/10 |
| 2002/0147937 | A1 * | 10/2002 | Wolf | 714/4 |
| 2003/0033406 | A1 * | 2/2003 | John et al. | 709/224 |

FOREIGN PATENT DOCUMENTS
WO    WO 98/53399    11/1998

OTHER PUBLICATIONS

Greenhalgh Chris et al., "Predicting network traffic for collaborative virtual environments," *Computer Networks and ISDN Systems* (1998) XP004138700.
Judge J. et al., "Sampling HTTP Response Packets For Prediction of Web Traffic Volume Statistics," *IEEE* (1998) XP-010339359.
Jamin Sugih et al., "A Measurement-Based Admission Control Algorithm for Integrated Service Packet Networks," IEEE (1997) XP 000678916.
Paxson Vern et al., "Wide Area Traffic: The Failure of Poisson Modeling," *IEEE* (1995) XP 000510987.
International Search Report PCT/US03/01993.

* cited by examiner

*Primary Examiner* — Philip Lee
(74) *Attorney, Agent, or Firm* — Alexander J Burke

(57) ABSTRACT

A network guidelines estimator (NGE) estimates a network load for each software application operating in a test network to determine network load metrics for each software application. A network load estimator (NLE) estimates a network load for one or more software applications concurrently operating in a production network responsive to the network load metrics of each of the one or more software applications. A network load analyzer (NLA) analyzes the network load for the one or more software applications concurrently operating in the production network to determine an actual network load for the production network.

13 Claims, 13 Drawing Sheets

FIG. 4

400 MEUI Window Field Details

WAN Definition Window 401          Global Results Window 403

Main Entry Screen

| Comment | Type of WAN | Number of WAN Lines | Port Speed or Upstream Speed K Bits per sec | PVC Speed or Downstream Speed K Bits per sec | Pre-Existing WAN Utilization Upstream % | Pre-Existing WAN Utilization Downstream % | Total WAN Utilization Upstream % | Total WAN Utilization Downstream % | WAN Status | Total Concurrent Clients | WAN SEG # |
|---|---|---|---|---|---|---|---|---|---|---|---|
| Main Hospital Data Center | | | 256 | 256 | | | 12.86 | 93.79 | OU | 22.00 | 1 |
| Remote Clinic 1 | FR | | 384 | 256 | 2.00 | 6.00 | 11.35 | 74.21 | OK | 16.00 | 2 |
| Remote Clinic 2 | FR | | 256 | 128 | 8.00 | 12.00 | 15.02 | 63.16 | OK | 6.00 | 3 |
| Home Dial-in via Internet | SU | 10 | 33 | 45 | | | 5.90 | 31.53 | WL | 1.30 | 4 |
| Remote Hospital | | | 128 | 128 | 5.00 | 9.00 | 8.51 | 34.58 | OK | 3.00 | 5 |
| | | | | | | | | | | | 6 |
| | | | | | | | | | | | 7 |
| | | | | | | | | | | | 8 |
| | | | | | | | | | | | 9 |
| | | | | | | | | | | | 10 |
| | | | | | | | | | | | 11 |
| | | | | | | | | | | | 12 |
| | | | | | | | | | | | 13 |
| | | | | | | | | | | | 14 |
| | | | | | | | | | | | 15 |
| | | | | | | | | | | | 16 |
| | | | | | | | | | | | 17 |
| | | | | | | | | | | | 18 |

WAN Configuration Map

| WAN SEQ | Specified Round Trip Propagation Delay Milli-sec | Distance Miles | Node 1 | Node 2 | Node 3 | Node 4 | Node 5 | Node 6 | Node 7 | Node 8 | Node 9 | Node 10 | Node 11 | Node 12 | Node 13 | Node 14 | Node 15 | Node 16 | Node 17 |
|---|---|---|---|---|---|---|---|---|---|---|---|---|---|---|---|---|---|---|---|
| 1 | | 5 | X | X | | | | | | | | | | | | | | | |
| 2 | | 100 | X | X | X | | | | | | | | | | | | | | |
| 3 | | 500 | X | | X | X | | | | | | | | | | | | | |
| 4 | | | | | | | X | | | | | | | | | | | | |
| 5 | | 600 | | | | | | 6 | 7 | 8 | 9 | 10 | 11 | 12 | 13 | 14 | 15 | 16 | 17 |

WAN Configuration Map Window 402

500
NAUI Window Field Details

Network Application Results Window 502

| Networked Application User Interface for Application 1 | | | | | | | Entry Window 501 | | | | 502 | | |
|---|---|---|---|---|---|---|---|---|---|---|---|---|---|
| | | | | | | | | CR | 20 | | | | |
| | | | | | | | | % of Use | 100 | | | | |
| Total WAN Utilization Upstream | Total WAN Utilization Downstream | Application's WAN Utilization Upstream | Application's WAN Utilization Downstream | WAN Status | Network Node | WAN SEG Distance | Additional SEG Round Trip Propagation delay | Local Node Client Count | Local Node CR | Local Node's Concurrent Client Count | Local Node's Network Latency | Total Network Latency |
| % | % | % | % | | | Miles | Milli-Secs | | % | | sec | sec |
| 12.86 | 93.79 | 12.86 | 93.79 | OU | 1 | 5.00 | 0 | | | 22 | 5.30 | 5.30 |
| 11.35 | 74.21 | 9.35 | 68.21 | OK | 2 | 100.00 | 0 | 10 | 30 | 16 | 0.32 | 5.62 |
| 15.02 | 63.16 | 7.02 | 51.16 | OK | 3 | 500.00 | 0 | 15 | | 6 | 0.36 | 5.66 |
| 5.90 | 31.53 | 5.90 | 31.53 | ERROR | 4 | | 400 | 2 | 65 | 1.3 | 2.57 | 8.19 |
| 8.51 | 34.58 | 3.51 | 25.58 | OK | 5 | 600.00 | 0 | 15 | | 3 | 0.60 | 6.25 |
| | | | | | 6 | | 0 | | | | | |
| | | | | | 7 | | 0 | | | | | |
| | | | | | 8 | | 0 | | | | | |
| | | | | | 9 | | 0 | | | | | |
| | | | | | 10 | | 0 | | | | | |
| | | | | | 11 | | 0 | | | | | |
| | | | | | 12 | | 0 | | | | | |
| | | | | | 13 | | 0 | | | | | |
| | | | | | 14 | | 0 | | | | | |
| | | | | | 15 | | 0 | | | | | |
| | | | | | 16 | | 0 | | | | | |
| | | | | | 17 | | 0 | | | | | |
| | | | | | 18 | | 0 | | | | | |

800
Process for reporting analysis results in the MEUI's Global Results Window and the NAUI's Results Window by the Analytical Engine

FIG. 11

1100
Single Output Trace File Display

1101

| Output Trace File ID | |
|---|---|
| Confidence Level (%) | 95 |
| WAN Speed | 128K |

Input 1
Input 2

Base Metrics                                  Output Control Summary       1103

| Concurrent Clients (Dialog) | 95 |
|---|---|
| Ave Active Clients | 20.58 |
| Ave CR % vs. Active | 4.6% |
| Ave Bytes Workstation to Server | 16154 |
| Ave Bytes Server to Workstation | 48846 |

1102

| Sample Interval Time | # of Samples | Low-end Filter | High-end Filter |
|---|---|---|---|
| 60 seconds | 13 | 10 Bytes | 90 |

WAN Load Metrics       1104

| WAN Speed | Mean | | | Mean @ Confidence Level | |
|---|---|---|---|---|---|
| 128K | LF % | CF | STD | LF % | CF |
| Workstation to Server | 1.68 | 8.57 | 0.02 | 1.69 | 9.94 |
| Server to Workstation | 5.09 | 11.9 | 0.06 | 5.12 | 10.9 |

Scroll Window for Output Trace File Record Display

| Field 1 | Field 2 | Field 3 | Field 4 | Field 5 | Field 6 |
|---|---|---|---|---|---|
| Sample Interval | Total Active Clients | Concurrent Clients | Ave Server Bytes | AVE Client Bytes | CR % |
| 1 | 210 | 10 | 50000 | 15000 | 4.76% |
| 2 | 200 | 9 | 48000 | 14000 | 4.50% |
| 3 | 204 | 9 | 55000 | 16000 | 4.51% |
| 4 | 205 | 8 | 60000 | 22000 | 3.88% |
| 5 | 213 | 10 | 50000 | 16000 | 4.69% |
| 6 | 208 | 11 | 55000 | 15000 | 5.28% |
| 7 | 190 | 7 | 62000 | 15000 | 3.68% |
| 8 | 210 | 11 | 48000 | 14000 | 5.05% |
| 9 | 204 | 10 | 50000 | 16000 | 4.66% |
| 10 | 198 | 9 | 49000 | 18000 | 4.55% |
| 11 | 206 | 10 | 60000 | 17000 | 4.76% |
| 12 | 214 | 11 | 50000 | 18000 | 5.1% |
| 13 | 209 | 10 | 48000 | 14000 | 4.78% |

1200
Complete Output Trace File Summary Display

1201

| WAN Speed | 128K | Input 1 |
| --- | --- | --- |
| WAN Threshold | 60% | Input 2 |
| Confidence Level | 95.00 | Input 3 |

Output Trace File Summary Window        1202

| Output Trace File ID | Sample Time | Enable | Concurrent Clients | Concurrency Rate % | LF Workstation to Server | LF Server to Workstation |
| --- | --- | --- | --- | --- | --- | --- |
| 1 | 8:00 AM | 1 | 9.50 | 4.60% | 1.69% | 5.12% |
| 2 | 8:30 AM | 1 | 9.00 | 4.00% | 3.00% | 5.00% |
| 3 | 9:00 AM | 1 | 12.00 | 6.00% | 3.00% | 6.00% |
| 4 | 9:30 AM | 1 | 10.00 | 7.00% | 2.00% | 4.00% |
| 5 | 10:00 AM | 1 | 8.00 | 4.00% | 3.00% | 5.00% |
| 6 | 10:30 AM | 1 | 9.00 | 4.00% | 2.00% | 4.00% |
| 7 | 11:00 AM | 1 | 10.00 | 5.00% | 4.00% | 7.00% |
| 8 | 11:30 AM | 1 | 11.00 | 3.00% | 3.00% | 5.00% |
| 9 | 12:00 PM | 1 | 2.00 | 1.00% | 0.50% | 1.00% |
| 10 | 12:30 PM | 1 | 3.00 | 1.00% | 1.00% | 2.00% |
| 11 | 1:00 PM | 1 | 8.00 | 4.00% | 4.00% | 7.00% |
| 12 | 1:30 PM | 1 | 12.00 | 5.00% | 3.00% | 5.00% |

Output Window

| Concurrent Workstations | CR | LF Workstation to Server | LF Server to Workstation | CF Workstation to Server | CF Server to Workstation |
| --- | --- | --- | --- | --- | --- |
| 10.35 | 4.86% | 3.02% | 5.61% | 11.29 | 7.65 |

1203

EXECUTABLE APPLICATION NETWORK IMPACT AND LOAD CHARACTERISTIC ESTIMATION SYSTEM

CROSS-REFERENCE TO RELATED APPLICATIONS

The present application is a non-provisional application of provisional application having Ser. No. 60/351,042 filed by Ed McBride on Jan. 22, 2002, and of provisional application having Ser. No. 60/366,507 filed by Ed McBride on Mar. 21, 2002.

FIELD OF THE INVENTION

The present invention generally relates to a system, method, computer product, and user interface for estimating network load employed by one or more software applications. More particularly, the present invention relates to a system, method, computer product, and user interface supporting estimating network load used by multiple concurrently operating executable software applications.

BACKGROUND OF THE INVENTION

Network capacity planning is a process of measuring a networks ability to serve content to its users at an acceptable speed. The process involves measuring the number of active users and by how much demand each user places on the server, and then calculating the computing resources that are necessary to support the usage levels.

Two key elements of network capacity performance are bandwidth and latency. Bandwidth is just one element of what a person perceives as the speed of a network. Another element of speed, closely related to bandwidth, is latency. Latency refers generally to delays in processing network data, of which there are several kinds. Latency and bandwidth are related to each other. Whereas theoretical peak bandwidth is fixed, actual or effective bandwidth varies and can be affected by high latencies. Too much latency in too short a time period can create a bottleneck that prevents data from "filling the pipe," thus decreasing effective bandwidth. Businesses use the term Quality of Service (QoS) to refer to measuring and maintaining consistent performance on a network by managing both bandwidth and latency.

Prior network capacity systems, either analytical and/or discreet event simulation tools, import a limited amount of live application traffic patterns to drive a model of user's network configurations. To validate a pre-existing network traffic model, a network analyst needs to compare two simulation runs and spend considerable time adjusting the pre-existing simulated traffic patterns to match the network load of the imported live traffic patterns. The effort to perform this task is challenging and is not usually attempted. Importing production traffic patterns, using trace files, is limited with respect to time coverage. It would be very difficult to import a series of trace files covering all the peak hours of traffic activity over-several weeks. It would also very difficult to identify and compare the simulated traffic with real production traffic in order to adjust the simulated patterns to allow for future simulation runs that can predict what affect new clients will have on network bandwidth requirements. Hence, using these tools for multiple applications is very time consuming, expensive and not usable by average individuals typically in the position to do network sizing and performance estimates.

Accordingly, there is a need for a system, method, computer product, and user interface supporting estimating network load used by multiple concurrently operating executable software applications.

SUMMARY OF THE INVENTION

A network guidelines estimator (NGE) estimates a network load for each software application operating in a test network to determine network load metrics for each software application. A network load estimator (NLE) estimates a network load for one or more software applications concurrently operating in a production network responsive to the network load metrics of each of the one or more software applications. A network load analyzer (NLA) analyzes the network load for the one or more software applications concurrently operating in the production network to determine an actual network load for the production network.

These and other aspects of the present invention are further described with reference to the following detailed description and the accompanying figures, wherein the same reference numbers are assigned to the same features or elements illustrated in different figures. Note that the figures may not be drawn to scale. Further, there may be other embodiments of the present invention explicitly or implicitly described in the specification that are not specifically illustrated in the figures and visa versa.

BRIEF DESCRIPTION OF THE DRAWINGS

FIG. 4 illustrates MEUI window field details for the MEUI of FIG. 3, in accordance with a preferred embodiment of the present invention.

FIG. 5 illustrates NAUI window field details for the NAUI of FIG. 3, in accordance with a preferred embodiment of the present invention.

FIG. 11 illustrates a single output trace file display, provided by the trace analyzer of FIG. 9, in accordance with a preferred embodiment of the present invention.

FIG. 12 illustrates a complete output trace file summary display, provided by the load and concurrency analyzer of FIG. 9, in accordance with a preferred embodiment of the present invention.

DETAILED DESCRIPTION OF THE PREFERRED EMBODIMENTS

Figure 1:
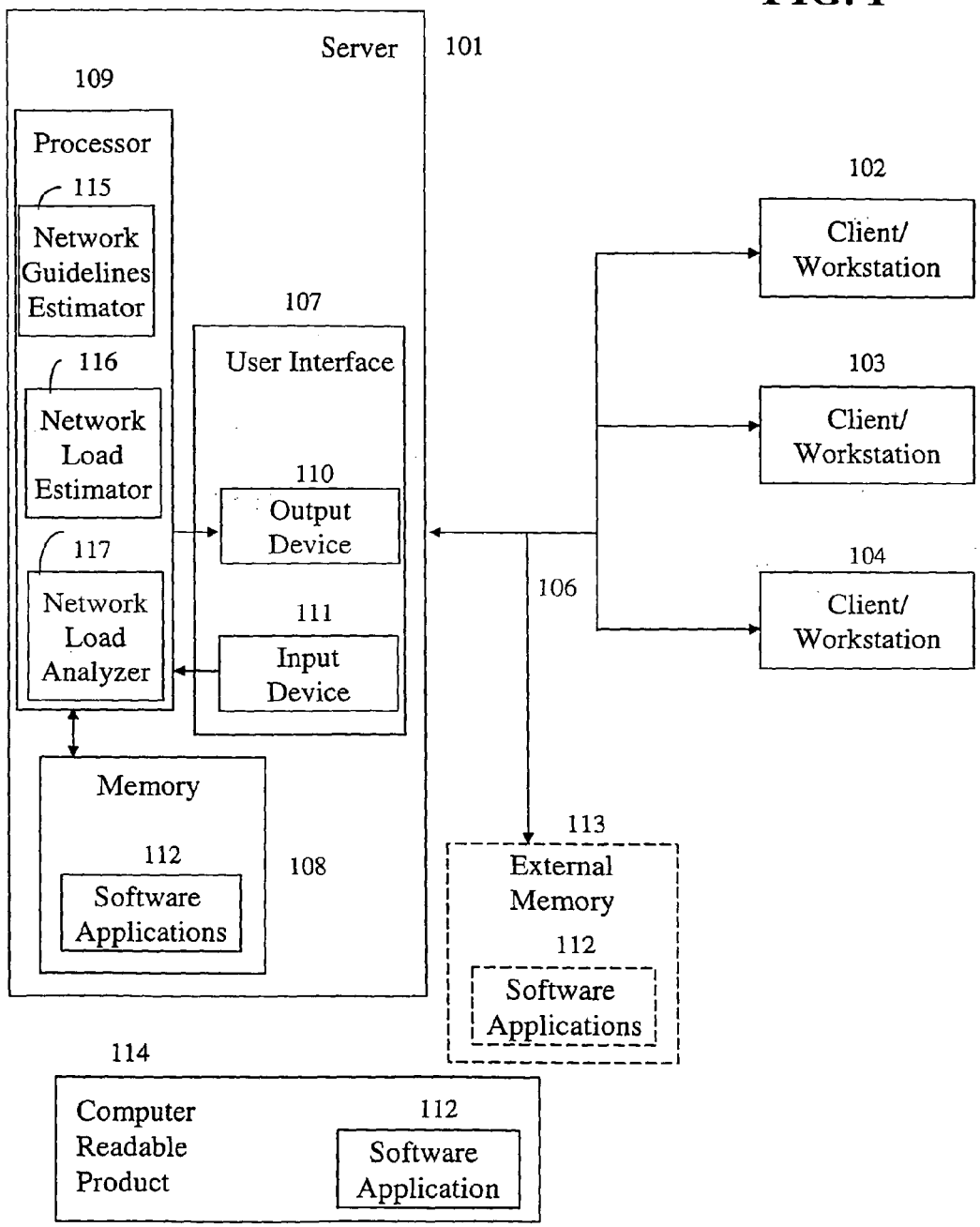
FIG. 1 illustrates a network, including a server electrically coupled to a plurality of client/workstations, in accordance with a preferred embodiment of the present invention.

FIG. 1 illustrates a network 100, including a server 101 electrically coupled to a plurality of client/workstations 102, 103, and 104 via a communication path 106, in accordance with a preferred embodiment of the present invention.

The network 100, otherwise called a computer network or an area network, may be implemented in many different shapes and sizes. Examples of networks 100 include, without limitation and in any combination, a Local Area Network (LAN), a Wide Area Network (WAN), a Metropolitan Area Network (MAN), a Storage Area Network (SAN), a System Area Network (SAN), a Server Area Network (SAN), a Small Area Network (SAN), a Personal Area Network (PAN), a Desk Area Network (DAN), a Controller Area Network (CAN), a Cluster Area Network (CAN). Hence, the network 100 may have any number of servers 101 electrically coupled to any number of client/workstations 102, 103, and 104 over any type of communication path 106 over any distance. Preferably, the network 100 is a WAN.

Generally, network descriptions, such as LAN, WAN, and MAN, imply the physical distance that the network spans or a distance-based concept. However, present and anticipated technology changes, via the Internet, intranet, extranet, virtual private network, and other technologies, now imply that distance is no longer a useful differentiator between the various networks. However, for the sake of consistency, these other types of network also became known as various types of networks.

For example, a LAN connects network devices over a relatively short distance. A networked office building, school, or home usually contains a single LAN, though sometimes one building will contain a few small LANs, and occasionally a LAN will span a group of nearby buildings. In Internet Protocol (IP) networking, one can conceive of a LAN as a single IP subnet (though this is not necessarily true in practice). Besides operating in a limited space, LANs typically include several other distinctive features. LANs are typically owned, controlled, and managed by a single person or organization. They also use certain specific connectivity technologies, primarily Ethernet and Token Ring.

Further, by example, a WAN spans a large physical distance. A WAN implemented as the Internet spans most of the world. A WAN is a geographically dispersed collection of LANs. A network device called a router connects LANs to a WAN. In IP networking, the router maintains both a LAN address and a WAN address. WANs typically differ from LANs in several ways. Like the Internet, most WANs are not owned by any one organization but rather exist under collective or distributed ownership and management. WANs use technology like leased lines, cable modems, Internet, asynchronous transfer mode (ATM), Frame Relay, and X.25 for connectivity. A WAN spans a large geographic area, such as a state, province, or country. WANs often connect multiple smaller networks, such as LANs or MANs. The most popular WAN in the world today is the Internet. Many smaller portions of the Internet, such as extranets, are also WANs. WANs generally utilize different and much more expensive networking equipment than do LANs. Technologies sometimes found in WANs include synchronous optical network (SONET), frame relay, and ATM.

The server 101 generally includes a user interface 107, a memory unit 108, and a processor 109. The memory unit 108 generally includes software applications ("applications") 112. The user interface 107 generally includes an output device 110 and an input device 111.

The server 101 may be implemented as, without limitation, a computer, a workstation, a personal computer, a handheld computer, a desktop computer, a laptop computer, and the like. The server 101 may be mobile, fixed, or convertible between mobile and fixed, depending on the particular implementation. Preferably, the server 101 is a computer adapted for a fixed implementation.

The processor 109, otherwise called a central processing unit (CPU) or controller, controls the server 101. The processor 109 executes, retrieves, transfers, and decodes instructions over communication paths, internal or external to the server 101, that are used to transport data to different peripherals and components of the server 101. The processor 109 includes a network guidelines estimator (NGE) 115, a network load estimator (NLE) 116, and/or a network load analyzer (NLA) 117, or an interface to each of the same elements 115, 116, and 117 located outside the server 101, but communicating with the processor 109, such as via the communication path 106. Each of the elements 115, 116, and 117 may be employed in hardware, software, and a combination thereof. Preferably, each of the elements 115, 116, and 117 is individually employed in the same or different networks 100 at the same or different times, as describe in further detail herein.

The memory unit 108 includes without limitation, a hard drive, read only memory (ROM), and random access memory (RAM). The memory unit 108 is a suitable size to accommodate the applications 112, and all other program and storage needs, depending on the particular implementation. The applications 112, otherwise called executable code or executable applications, are preferably application specific provider (ASP) executable applications deployed over a WAN.

In the user interface 107, the input device 111 permits a user to input information into the server 101 and the output device 110 permits a user to receive information from the server 101. Preferably, the input device is a keyboard, but also may be a touch screen, a microphone with a voice recognition program, for example. Preferably, the output device is a display, but also may be a speaker, for example. The output device provides information to the user responsive to the input device receiving information from the user or responsive to other activity by the server 101. For example, the display presents information responsive to the user entering information in the server 101 via the keypad. FIGS. 4, 5, 11, and 12 illustrate examples of the user interface 107.

The server 101 may also contain other elements, well known to those skilled in the relevant art, including, without limitation, a data input interface and a data output interface providing communication ports that permit data to be received by and sent from, respectively, the server 101. The data input interface and the data output interface may be the same interface, permitting bi-directional communication, or different interfaces, permitting opposite, unidirectional communication. Examples of the data input interface and the data output interface include, without limitation, parallel ports, and serial ports, such as a universal serial bus (USB). Each of the elements 115, 116, and 117 may communicate with the server 101 using the data input interface and the data output interface, when the elements 115, 116, and 117 are located outside of the server 101.

Each of the client/workstations ("client") 102, 103, and 104 may be implemented as, without limitation, a computer, a workstation, a personal computer, a handheld computer, a desktop computer, a laptop computer, and the like. Each of the clients 102, 103, and 104 may be mobile, fixed, or convertible between mobile and fixed, depending on the particular implementation. Preferably, each of the clients 102, 103, and 104 are adapted for a fixed implementation.

The communication path 106 electrically couples the server 101 to each of the clients 102, 103, and 104. The communication path 106 may be wired and/or wireless or accommodate the fixed and/or mobile server 101 or clients 102, 103, and 104, respectively. Examples of wired communication paths include, without limitation, LANs, leased WAN circuits, ATM, frame relay. Examples of wireless communication paths include, without limitation, wireless LANs, microwave links, satellite. Preferably, the communication path 106 is wired.

The network 100 may also include an external memory unit 113 for storing software applications 112. The external memory unit 113 may include, without limitation, one or more of the following: a hard drive, read only memory (ROM), and random access memory (RAM). The external memory unit 113 is a suitable size to accommodate the applications 112, and all other program and storage needs, depending on the particular implementation. The external memory unit 113 may be used in cooperation with or as a substitute for the memory unit 108 in the server 101, depending on the particular implementation of the server 101, and the network 100.

Computer readable product 114, preferably a computer readable storage medium, comprises a disk (such as a compact disk (CD), for example, or other portable storage medium containing the executable application 112 for insertion or downloading in memory unit 108 or external memory unit 113.

Figure 2:
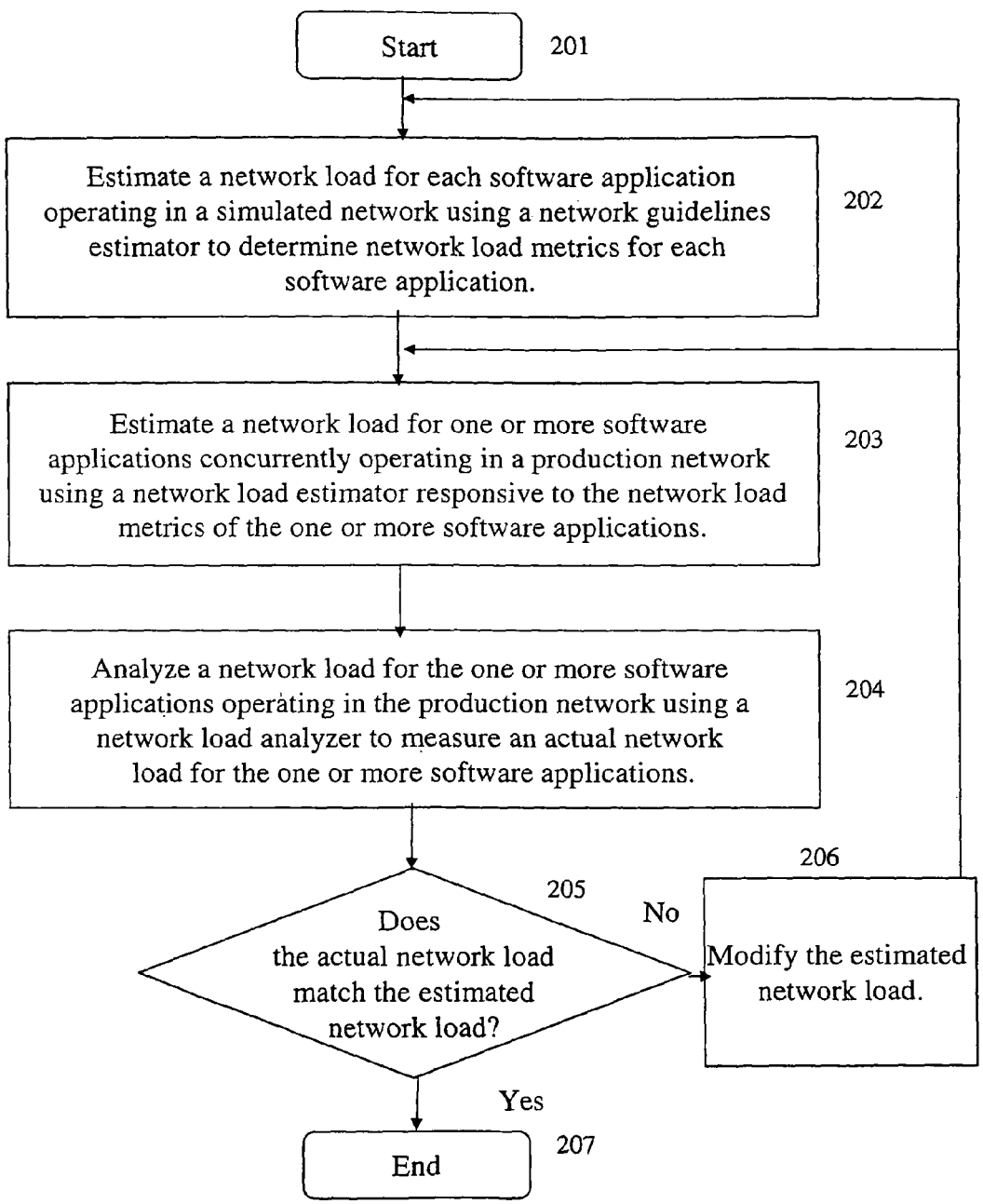
FIG. 2 illustrates a process for determining network load employed by one or more applications concurrently operating in the network, as shown in FIG. 1, in accordance with a preferred embodiment of the present invention.

FIG. 2 illustrates a process 200 for determining network load employed by one or more applications 112 concurrently operating in the network 100, as shown in FIG. 1, in accordance with a preferred embodiment of the present invention.

The process 200, otherwise called a method, begins at step 201.

At step 202, the network guidelines estimator (NGE) 115, shown in FIG. 1, estimates a network load for each software application operating in a simulated network to determine network load metrics for each software application. The structure and function of the network guidelines estimator (NGE) 115 is described in detail in provisional application having Ser. No. 60/366,507 filed by Ed McBride on Mar. 21, 2002.

The delivery of an application 112 on a network 100 is typically successful when application's network behavior is reasonably characterized, especially for a WAN. The characteristics of the applications are determined by testing them in a controlled network environment, otherwise called a simulated or test network, to determine the application's network behavior. This process is called application network baseline profiling.

Preferably, application network baseline profiling is performed in a controlled test environment having the following three conditions:

1. The server(s) 101 and the clients 102-104 are on a LAN.

2. The network traffic between all application components is visible on the LAN at a single network location when the client executes a function of the application 112.

3. One client (i.e., a test client) is using the server(s) 101.

Two network tools are used to perform the application network baseline profiling.

1. A conventional third party software tool, such as Application Expert™ tool, captures the application's network traffic when the test client executes application functions.

2. The NGE 115 uses information from Application Expert tool to calculate the application's network load and latency parameters and other metrics that profile the application's network behavior.

The following text under step 202 describes the process for profiling an application's network load characteristics, a process to profile an application's network latency performance, and a process to estimate a networks capacity requirements when deploying multiple user clients over a WAN responsive to the application's network load characteristics. The following description references the following definitions:

1. Concurrent users: Clients of the application that are active (i.e., generating network traffic) in any given predetermined (e.g., one-minute) time interval.

2. Active users: Number of clients that are logged on to the application at a given time using the system at an ordinary pace (i.e., executing functions, making on-line updates and selections, and reviewing and evaluating screen information, etc.).

3. Deployed users: Clients with the application installed.

4. Task: Individual application functions executed to accomplish a specific task (i.e., a sub-unit of work).

5. Work Unit: A sequence of tasks executed to complete a unit of work that the application was designed to accomplish. Applications generally have many types of work units.

The process for profiling an application's network load characteristics is described as follows. One characteristic of an application's network load is a load factor. The load factor is the calculation of the average network load that a user of a particular application generates while using an application. The load factor is calculated using the following information:

1. List of work units that users can execute when using an application.

2. List of all tasks (i.e., application functions) that make up each work unit.

3. Frequency of use of each work unit, if this is practical to determine or estimate.

Preferably, at least 95% of the application's typical work units are tested in the test network, by capturing the network traffic generated while a test client executes each work unit. A separate capture file is saved for each work unit.

Testing involves measuring the network load placed on the LAN in the controlled laboratory environment using the conventional third party software tool. Preferably, a person (i.e., a test user) with experience in use of the application manually conducts the test to collect accurate measurements. Alternatively, the test may be performed automatically. The experienced user executes the work units at the approximate speed of a predicted end user, including computer processing time and user think time. The executed work units are used for profiling the work units to obtain a reasonable network load factor (LF) and a completion time for a work unit (i.e., the work unit completion time) (WCT). The application's network load factor and work unit completion time are also used by the NLE 116 to estimate how many user workstations can be deployed on a WAN, as described herein below.

After the application is tested, the network traffic information stored in each work unit capture file is imported into the NGE 115. The NGE then calculates the application's network load factor, which specifies the average amount of network capacity (i.e., bandwidth) used when a user is executing work units. The network load factor relates to the application's network load profile and how network friendly it is.

The NGE 115 uses the network load factor to determine a concurrency factor (CF), which specifies the maximum number of concurrent users a network can support before reaching some predetermined threshold capacity that identifies the limit or breakpoint of the network. For example, if a network has a recommended predetermined threshold capacity of 60% capacity and an application has a network load factor of 2%, the concurrency factor is 30 (i.e., 60%/2%). The concurrency factor indicates that 30 concurrent users will require 60% of the network capacity.

The NGE 115 uses the concurrency factor and the work unit completion time to estimate the total number of deployable clients that that a production network 100 can support. By accurately estimating the number of concurrent users that need to be accommodated during peak time, the network load information can be used to properly size and configure a production network 100.

The following text under step 202 describes the process for determining an application's network latency profile. Since tasks are sub-units of work, a user executing application tasks is sensitive to response time. For example, after a user presses the enter key to start the execution of a task, the user may be expecting a completed response within two seconds. If the user's workstation 102-104 is on the same LAN that the server 101 is on, the response may come back in one second. Most of this time would be server 101 and workstation 102-104 processing time. Very little of this time would be due to the network latency (NL) of the LAN. However, if the user's workstation 102-104 is separated from the server 101 by a WAN, network latency can contribute to a significant delay. An application's performance characteristics can be determined, by testing the application tasks and by using the NGE 115 to profile the application's network latency metrics.

Three components to latency that cause network response delay include:

1. Insertion or Transmission Delay—caused by the speed of the LAN or WAN.
2. Propagation Delay—dictated by the distance data has to travel over the network.
3. Queue Delay—Delay due to congestion from sharing a network among multiple users. This is why a network needs a predetermined capacity threshold.

To profile an application's network latency characteristics, the conventional third party software tool individually tests each task executed when testing the work units. During these tests, the network traffic generated is captured in a network trace file, wherein there is one network trace file for each task. The network trace files are imported into the NGE 115, which calculates the parameters that produce the application's average network latency metric. The NGE 115 also produces a detailed listing of each task identifying the task's specific network latency.

The NGE 115 also provides latency parameters that are imported into the NLE 116, which is used to estimate the aggregate effect on one application 112 when sharing a network 100 with additional applications 112. The following parameters are averages over all tested tasks.

1. Average task traffic size in bytes.
2. Average number of request/response pairs. These are called application turns that interact with a WAN's propagation delay (i.e., distance). Any application task that has a large number of turns will suffer large network latencies, which cannot be reduced by increasing the WAN's bandwidth (speed).
3. Average size of the data frames used to send data over the network.
4. Application workload and estimating workstation deployment.

The following text under step 202 describes the process to estimate a network's capacity requirements when deploying multiple clients over a WAN, otherwise called workload. The term workload refers to the number of work units (WU) completed in a predetermined (e.g., one hour) time period (i.e., a peak hour). The NGE 115 calculates a metric called the application's work unit completion time (WCT). The work unit completion time is an average value of all WUs tested, which is adjusted to a 95% confidence value based on the variance of all work units tested.

To estimate, on average, the maximum number of WUs completed in one hour, when each one-minute interval has, on average, one user active, divide sixty minutes by the WCT. As mentioned above, each unit value of concurrency factor (CF) is equal to one user active in any one-minute interval. Hence, the maximum workload a network 100 can support before exceeding the network's capacity threshold is the concurrency factor (CF) value times sixty minutes divided by WCT.

For example, if WCT is two minutes, then the maximum WUs per hour for a CF value of one is thirty (i.e., 60/2). If network's concurrency factor (CF) value equals ten, then three hundred WUs per hour can be supported. A question for delivery of an application in a production network is how many workstations are required to generate 116 WUs, which is addressed herein below.

The following text under step 202 describes a general application classification as it relates to the workload. It is helpful to ask two questions when attempting to establish the application's workload with respect to the number of workstations deployed.

1. What category does the application fall in?
2. What is the expected workload per hour for the power user within the top ten users?

Typically, users are separated into three classes:

1. Casual users
2. Standard users
3. Data Entry users

The class of an application user can be identified by the total amount of time, over one hour, that the power user (i.e., a strong user in the class) spends executing the application. Reasonable classifications of time for a power user in each class include:

1. Casual: The power user executes from 0 to 10 minutes (5 minutes mid-point).
2. Standard: The power user executes 10 to 30 minutes (20 minutes mid-point)
3. Data Entry: The power user executes 30 to 50 minutes (40 minutes mid-point)

The purpose of the application 112 and its usage pattern help to identify and establish a conservative estimate for the power user. The average number of WUs executed by the power user, in one hour, can be established using the application's work unit completion time (WCT). For example, if the mid-point is identified as a conservative value for the application's power user, and if the application's WCT is two minutes, then:

1. In a Casual user type application, the power user will average 2.5 WUs per hour.
2. In a Standard user type application, the power user will average 10 WUs per hour 3. In a Data Entry user type application, the power user will average 20 WUs per hour In the preferred embodiment of the present invention, the applications 112 tested fell within the standard user class, and most fell in the general area of the mid-point with some applications on the low and high limits.

The following text under step 202 describes estimating a base workload. Once the power user's workload is specified, the base workload (BWL) can be established. The BWL is defined by number of WUs per hour averaged over the top-ten user workstations. The BWL is then used to estimate total workload when additional user workstations are added to the top-ten. Preferably, the application's BWL is not customer specific, which would be difficult to determine, and would risk over-sizing or under-sizing network capacity requirements.

To establish the BWL after setting the power user's workload, the total average workload for the top-ten users is estimated. Dividing this value by ten gives the BWL, which is the average number of WUs per top-ten user. The total average workload for the top-ten users can be conservatively established, based on the power user's workload. The total average workload is determined as follows:

Total Workload=(10×Power User's Workload)/2

For Example, if the power user averages ten WUs per hour, then:

Total Workload=(10×10)/2=50 WU's per hour, and

BWL=50/10=5 WUs per top-ten users.

The BWL is used to establish the total workload when additional user workstations, beyond the top ten, are being deployed. A short cut formula for BWL is:

BWL=Power User Workload/2.

The following text under step 202 describes the workload and user workstation deployment. As additional users beyond the top-ten are added to the network, the total workload increases in a non-linear manner. Typically, adding ten more users to the top-ten will not double the workload. Using a conservative estimate for the total workload is important when determining the network capacity requirements for a specified number of workstations. On a LAN, this is normally not an issue, but on a WAN this becomes significant because of the size difference between the LAN and the WAN. In the preferred embodiment of the present invention, the BWL for the applications tested are reasonably conservative and applicable for all users of the application. Hence, there is a low probability of severe over-estimating or under-estimating the WAN capacity using the BWL.

Both the NGE 115 and NLE 116 estimate the total workload as follows.

Total Workload=BWL×AWS/LOG(AWS), wherein

AWS is the total number of Active Workstations (i.e., workstations Logged-In), and
the LOG to the base 10 function produces a gradual reduction in the growth of total workload as additional users are added. This logarithmic function is a very conservative modification to linear growth.

For example, if BWL=5 WUs per hour (this is an average for the top-ten users), and if AWS=10, then Total Workload=5×10/LOG(10), or Total Workload=5×10/1=50 WUs per hour (i.e., top-ten user workload)

By a second example, if BWL=5 WUs per hour, and if AWS=20, then

Total Workload=5×20/LOG(20), or

Total Workload=5×20/1.3=76.9 WUs per hour.

In contrast to the second example, linear growth would result in 100 WUs per hour.

By a third example, if BWL=5 WUs per hour, and if AWS=200, then

Total Workload=5×200/LOG(200), or

Total Workload=5×200/2.3=434.8 WUs per Hour

In contrast to the third example, linear growth would result in 1000 WUs per hour.

The total number of work hours completed in the one hour period by all active users is equal to the total workload times the application's WCT (WU Completion Time) divided by 60 minutes.

For example, in the third example of 200 users above, if the WCT=2 minutes, then Work Hours(WH)=434.8×2 minutes/60 minutes=14.5 hours of work.

If the application's concurrency factor (CF) value for the network is equal to or greater than 14.5, then the network can support the workload without exceeding the network's threshold capacity.

The following text under step 202 describes a process for estimating the number of active users. The formula for total workload requires the number of active users (i.e., logged-in users). The following description determines how active user workstations relate to the total number of deployed workstations. Preferably, the following predetermined algorithm is used: if the deployed workstations are less than or equal to forty, then the active users equals deployed users. However, if the deployed workstations are greater than forty, then the active users are gradually reduced. The need to make the gradual reduction is because the number of log-ins does not increase in a linear manner with an increase in deployed workstations. When the deployed workstations are greater than forty, the following formula is used.

Active Users=Deployed Users×1.6/LOG(Deployed Users)

For example, if Deployed Users equals 100, then

Active Users=100×1.6/LOG(100)=100×1.6/2=80 (i.e., 80%) Active Users.

In a second example, if Deployed Users equals 1000, then

Active Users=1000×1.6/LOG(1000)=1000×1.6/3=533 (i.e., 53%) Active Users.

Preferably, the testing in step 202 is performed in a simulated network environments representing anticipated networks that may use the application. Preferably, a manufacturer (or an approved third party) of an application performs the network load testing on the application in the simulated production environments to generate the network load metrics before the application is shipped to, or sold to the end user, as a computer readable storage medium. The computer readable storage medium includes, without limitation, a magnetic disk or tape, an optical disk such as a computer read only memory (CDROM), a hard drive, and data delivered over a communication path, such as a phone line, the Internet, a coaxial cable, a wireless link, and the like. The simulations may be simple or complex as the anticipated production environments and anticipate end user considerations require to generate few or many, respectively, network load metrics. The task of generating many network load metrics may employ various analytical methods, such as statistics, to providing near continuous network load metric points, without physically running the application in each simulated network environment. Further, the many network load metrics may be predetermined and stored in a database or pre-characterized and represented by equations having input and output variables. Preferably, the network load metrics, or their representative equations, are incorporated with the application's set up files. Then, a network administrator uses the network load metrics for one of the simulated network environments that is closest to the actual production environment. Alternatively, the network administrator may input the characteristics of the actual production network environment into an input window, associated with the set up files, and the set up program provides the end user with recommended network load metrics to be used.

At step 203, the network load estimator (NLE) 116, shown and described in further detail in FIGS. 3-8, estimates network load for one or more applications 112 concurrently operating in a production network 100 responsive to the network load metrics determined by the NGE 115 for each of the one or more application.

The NLE 116 uses the application's network load factor and work unit completion time to estimate how many user workstations can be deployed on a WAN. The NLE 116 aggregates the metrics for a large number of different applications 112 allowing it to quickly estimate the WAN's capacity requirements when deploying more than one type of application. The NLE 116 supports complex WAN topologies and aggregates the effects of network load and latencies, thus integrating the impact of multiple applications sharing a WAN. The NLE's inputs come from the NGE 115, and allow a relatively unskilled administrator to work with many different applications in a shared production network environment. By contrast, the NGE 115 only specifies the network profile characteristics of a single application.

Each application 112 in the NLE 116 contains three network load parameters. These parameters are obtained from the NGE 115 when the application 112 profiling process is completed. The three parameters are:

1. Application's CF (Concurrency Factor) specified for a predetermined (e.g., 128 kbits per second) WAN.
2. Application's BWL (Base Workload).
3. Application's WCT (Workload Completion Time).

To initialize the NLE 116, the administrator configures the WAN speed, selects an application 112, and inputs the number of deployed workstations. The NLE 116 uses the load parameters for the application 112 and the formulas, discussed above, to calculate network capacity used for a specified WAN speed. If more than one application 112 is deployed the NLE 116 will calculate the total capacity used by all the applications 112.

The NLE calculation process is summarized by the following process:

1. Calculate the number of active workstations.
   If Deployed Workstations >40, then AWS=(Deployed Workstations×1.6)/LOG(Deployed Workstations).

2. Calculate the Total Workload.

Total Workload=BWL×AWS/LOG(AWS)

3. Calculate the Total Work Hours.

Total Work Hours=Total Workload×WCT/60

4. Calculate the WAN capacity required (bandwidth usage).

Capacity Required=Total Work Hours/CF.

If the Capacity Required>1, then a higher speed WAN is required.
   If the Capacity Required=1, then the bandwidth usage is at the WAN's threshold.

WAN Bandwidth Usage=Threshold×Capacity Required.

For example, if CF=20, Total Work Hours=10, and WAN threshold=60%, then WAN Bandwidth Usage=0.5× 60%=30%.

Together steps 202 and 203 describe a method for operating a system 101 for estimating network load. The system 101 includes the NGE 115 and the NLE 116, shown in FIG. 3. The NGE 115 analyzes a network load for each software application 112 operating in a simulated network 100 to determine network load metrics for each software application 112. The NLE 116 estimates a network load for one or more software applications 112 concurrently operating in a network 100 responsive to the network load metrics of each software application 112.

Preferably, the NGE 115 analyzes the network load for each software application 112 while operating in a simulated network, such as when a manufacturer of the software application 112 performs the analysis by the NGE 115. In the manufacturer case, the network load metrics for each software application 112 are advantageously provided to a buyer with the software application 112 when purchased by the buyer of the software application 112.

From the perspective of the NGE 115, the NGE 115 is executed within a processor 109 (which employs the NGE 115, the NLE 116, and the NLA 117) to estimate a network load for each software application 112 operating in a network 100 to determine network load metrics for each software application 112. The network load metrics are used by a NLE 116 for estimating a network capacity for one or more software applications 112 concurrently operating in a network 100 responsive to the network load metrics of each software application 112.

From the perspective of the NLE 116, the NLE 116 is executed within a processor 109 to estimate a network capacity for one or more software applications 112 concurrently operating in a network 100 responsive to predetermined network load metrics of each software application 112. The predetermined network load metrics represent a network load for each software application 112 operating in a network 100.

From the perspective of the computer readable storage medium 114, the computer readable storage medium 114 includes an executable application, and data representing network load metrics. The executable application is adapted to operate in a network 100. The data representing network load metrics associated with the executable application 112 is usable in determining a network load representative value for the executable application 112 operating in the network 100. Preferably, the network load metrics are adapted to be used by a NLE 116 for estimating a network capacity for one or more executable applications 112 concurrently operating in a network 100 responsive to the network load metrics.

The network load metrics preferably include at least one of: (a) an estimated average number of bytes transferred in a time interval using the application, (b) an estimated maximum number of bytes transferred in a time interval using the application, (c) an estimated minimum number of bytes transferred in a time interval using the application, (d) a client's average network load factor, (e) an average data packet size, (f) an average number of request/response pairs in an application transaction, and (g) an average number of bytes transferred between a client and at least one server when executing an application transaction. Average values can refer to median, arithmetic mean, or arithmetic mean adjusted to a specified confidence level. The last type accounts for the degree of distribution in the samples when calculating the mean. The value of the mean is increased if the sample distributions are large and/or the confidence is high (for example 95%+).

At step 204, a network load analyzer (NLA) 117, shown and described in further detail in FIGS. 9-12, analyzes the network load for the one or more application operating in the production network 100 to measure the actual network load for the one or more applications. Because the NGE 115 and the NLE 116 both provide an estimated network load, the NLA 117 measures the actual network load to determine if the estimated network load is accurate. Preferably, the NLA 117 should be run whenever the conditions of the network 100 substantially change.

At step 205, a determination is made whether the actual network load measured at step 204 matches the estimated network load determined in step 202 or step 203. If the determination at step 205 is positive, then the process 200 continues to step 207; otherwise, if the determination at step 205 is negative, then the process 200 continues to step 206. Preferably, the determination at step 205 is performed manually, but may be performed automatically, if desired.

At step 206, the estimated network load is modified in step 202 or step 203. Preferably, the determination at step 206 is performed manually, but may be performed automatically, if desired. Preferably, the estimated network load using the NLE 116 for each production network is modified responsive to the actual network load measured by the NLA 117. However, because individual production networks may vary, the estimated network load using the NGE 115 based on the simulated network is modified responsive to actual network load measurements by the NLA 117 from multiple production networks.

At step 207, the process ends.

Figure 3:
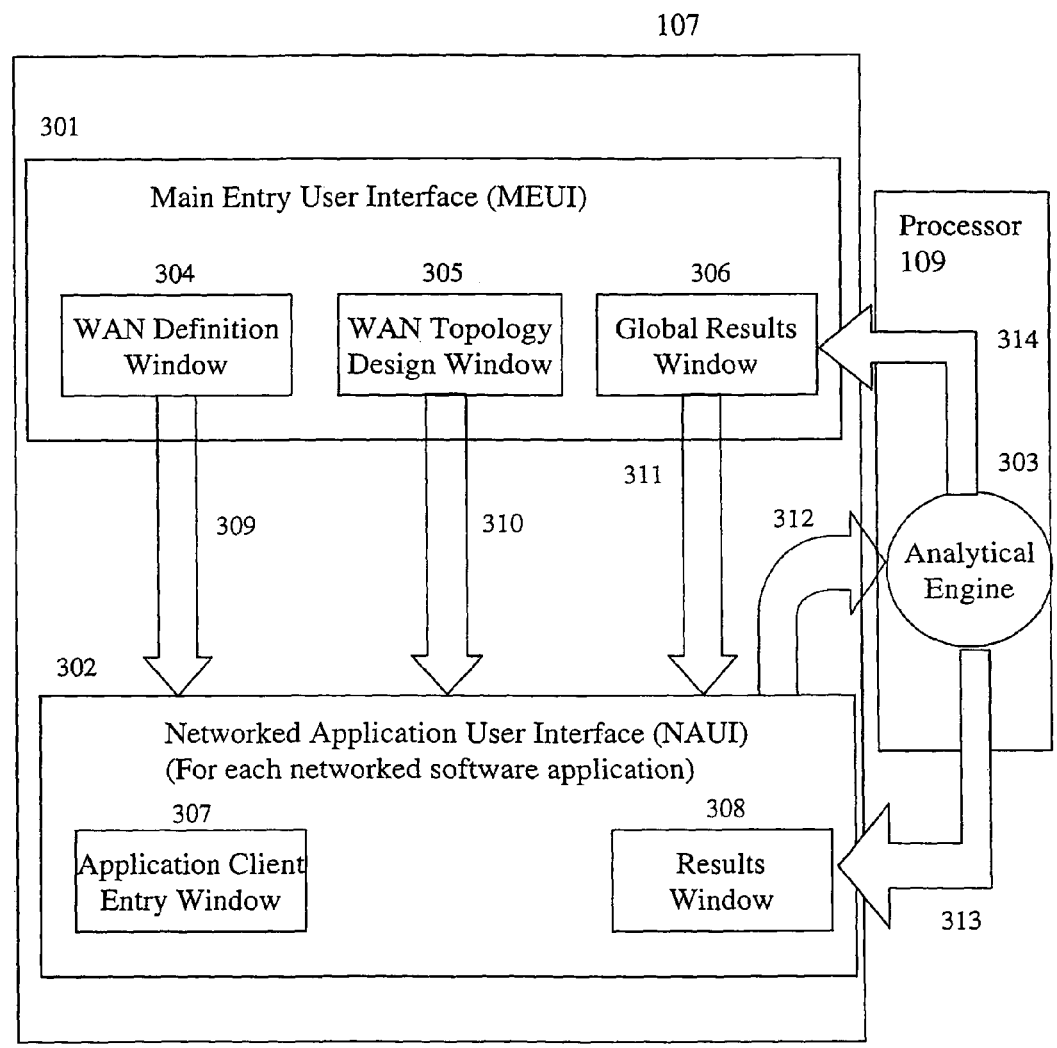
FIG. 3 illustrates a network load estimator (NLE), including a main entry user interface (MEUI), a networked application user interface (NAUI), and an analytical engine, employed by the server of FIG. 1, in accordance with a preferred embodiment of the present invention.

FIG. 3 illustrates a network load estimator (NLE) 116, including a main entry user interface (MEUI) 301, a networked application user interface (NAUI) 302, and an analytical engine 303, employed by the server of FIG. 1, in accordance with a preferred embodiment of the present invention. The MEUI 301 includes a WAN definition window 304, a WAN topology window 305, and a global results window 306. The NAUI 302 includes an application client entry window 307 and a results window 308. The MEUI 301 and the NAUI 302 each form portions of the user interface 107, shown in FIG. 1, and the analytical engine 303 forms a portion of the processor 109, shown in FIG. 1.

The NLE 116 contains one MEUI 301, and one NAUI 302 for each defined application. The number of NAUIs 302 equals the number of application incorporated into the NLE 116. The MEUI 301 feeds data to each NAUI 302, via connections 309, 310, and 311. The analytical engine 303 calculates network performance characteristics using data from each NAUI 302 that has been configured for analysis, via connection 312. The analytical results from the analytical engine 303, unique to each configured application, are displayed in the application's NAUI results window 308, via connection 313. The analytical engine 303 receives data from the NAUI 302 for all configured applications and displays combined results in the global results window 306 on the MEUI 301, via connection 314.

An advantage of simplicity of the NLE 116 is partially based on the MEUI 301 and NAUI 302 and type of information a user needs to enter to perform application network analysis and capacity planning. The simplicity of using the NAUI 302 is partially based on the information used to define a NAUI 302 and to incorporate a new application in the NLE 116. The information used to define an NAUI 302 is the result of prior, in depth testing of the application to profile the application's network characteristics, and to establish mean values of the network metrics used for NLE inputs, as shown and described with reference to FIG. 2.

FIG. 4 illustrates MEUI window field details 400 for the MEUI 301 of FIG. 3, in accordance with a preferred embodiment of the present invention. The MEUI 301 provides a user interface for a network analyst to establish the WAN topology and network characteristics. The MEUI 301 includes a WAN definition window 401 (eight columns), a WAN configuration map 402 (eighteen columns), and a global report window 403 (four columns).

Each row encompassing the three window areas 401, 402, and 403 represents one WAN segment. Each WAN segment represents one WAN line between two network nodes, unless the number of WAN Lines entry field is used to specify more than one WAN per WAN segment (see field—number of WAN lines described herein). For example, the WAN segments shown in FIG. 4 include a main hospital data center, a first remote clinic, a second remote clinic, a home dial-in via the Internet, and a remote hospital.

The WAN definition window 401 is used to define the overall WAN performance characteristics and includes the following eight fields:

"Type of WAN" field (column 2): This field identifies the base structure of each WAN links' technology. Preferably, three base structures are supported including: frame relay (FR), asynchronous transfer mode (ATM), and Single User (SU) for a line (one user on a dial modem, a cable modem, or digital subscribe line (DSL) circuit). Preferably, the default value is a blank indicating a multi-user dedicated line (Internet or private line).

"Number of WAN Lines" (column 3): This field is used to specify the number of WAN lines in the WAN segment. This field is generally used to specify number of SU users specified in the type of WAN field.

"Port Speed or Upstream Speed" (column 4): If the field "Type of WAN" is set to FR or ATM, then a value in this specifies the port's data bit rate (i.e., burst rate). For other WAN types, a value in this field specifies WAN line's upstream data bit rate. This field has units represented in kbits per second.

"PVC Speed or Downstream Speed" (column 5): If the field "Type of WAN" is set to FR or ATM, then a value in this field specifies the committed information rate (CIR) data bit rate (i.e., burst rate). For other WAN types, a value in this field specifies the WAN line's upstream data bit rate. This field has units represented in kbits per second.

"Pre-Existing WAN Utilization Upstream" (column 6): This field allows a user to specify the amount a WAN bandwidth capacity that is used by background data traffic on the upstream link. A value in this field is a portion of 100% capacity.

"Pre-Existing WAN Utilization Downstream" (column 7): This field allows a user to specify the amount a WAN bandwidth capacity that is used by background data traffic on the downstream link. A value in this field is a portion of 100% capacity.

"WAN Segment Distance" (column 13): This field specifies the physical distance data traffic must travel between nodes connected by the WAN segment. This field has units represented in miles.

"Specified Round Trip Propagation Delay" (column 14): This field allows a user to specify an explicit value for round trip propagation delay. It may be used to supplement or replace the "WAN Segment Distance" (column 13). This field has units represented in milli-seconds. This field is useful when estimating propagation delay through the Internet.

Next, referring to the WAN configuration map window 402, this window 402 is used to define the overall WAN physical topology (i.e., define how the WAN segments are connected with each other to form the overall WAN structure), and includes the following eighteen fields.

"WAN Configuration Map" (columns 15-33): This 18 row×18 column matrix area is used to define and connect the WAN Segments defined in the WAN definition window 401. Connecting the WAN segments allows the analysis engine 303 to estimate the cumulative network load on each WAN segment, and to estimate the total network latency delays the data traffic encounters due to multiple hops through the WANs. Each column in the matrix is corresponds to a node (1-18). The nodes are locations where application clients can reside when one or more NAUIs are used to configure applications for analysis. Also note that node 1 corresponds to WAN segment 1 (column 12), node 2 corresponds to WAN segments 2, etc. An "X" is placed in entry cells to the right of the node markers (shown as a darkened cell) to specify the downstream WAN segments that connect to the specific node marker. An "X" is placed in entry cells to the left of the node markers (shown as a darkened cell) to specify the upstream WAN segments that connect to the specific node marker. For example, FIG. 4 shows that node 1 is connected to node 2 via WAN segment 2 and to node 3 via WAN Segment 3. It also shows that node 2 is connected to node 4 (downstream) via WAN segment 4 and to node 1 (upstream). FIG. 4 also illustrates other various WAN connections.

Next, referring to the global report window 403, the window 403 includes the following four fields.

"Total WAN Utilization Upstream" and "Total WAN Utilization Downstream" (columns 8 and 9, respectively): These two fields provide the metrics for WAN capacity planning, a useful factor in effectively managing the deployment of new applications. Values specified in these fields represent a calculated combined bandwidth capacity used by all networked applications configured on the WAN topology, including a background utilization specified in the "Pre-Existing WAN Utilization" fields (columns 7 and 8). Each application is configuration using the NAUI 302.

"WAN Status" (column 10): This flag field indicates the health of the WAN segments. When the total WAN utilization, on a segment, exceeds a preset threshold, the flag "OU" indicates the WAN Segment is "over utilized." WAN speed must be increased to accommodate the networked applications. The "WL" status flag applies only on single user (SU) WAN segments. "WL" indicates that a preset threshold has been exceeded where a single user "workload" may be unreasonably high. This workload is set using one of the NAUI windows 500, as shown in FIG. 5. The "OK" status flag indicates that the total WAN utilization is equal to or below the preset threshold.

"Total Concurrent Clients" (column 11): This field identifies the total number of application clients concurrently active on each WAN segment. This value is calculated using information from one or more NAUI windows 500, as shown in FIG. 5, used to configure applications on the WAN topology. Low values specified in this field indicate that one or more configured applications are less than network friendly. Specific application(s) causing low values can be identified in a specific NAUI window 500.

FIG. 5 illustrates NAUI window field details 500 for the NAUI 302 of FIG. 3, in accordance with a preferred embodiment of the present invention. Preferably, each application has a NAUI window 500. Each NAUI window 500 contains two general window areas including an application client entry window 501 and a networked application results window 502.

An application included as a member of the NLE 116 has one NAUI window 500 used to configure the application onto the WAN topology defined in the MEUI 301. When a NAUI 302 is defined in the NLE 116, specific network performance parameters are installed in the NAUI 302 that specify how the specific application uses network resources when clients are actively transferring data over WAN lines. These parameters, otherwise called metrics, result from previous testing of the application using the NGE 115 to profile the application's network characteristics, as shown and described with reference to FIG. 2. After the parameters have been entered in the NAUI 302, the application is defined as part of the NLE 116. Preferably, these network parameters are not viewable or accessible to NLE users.

The analysis engine 303 uses the NAUI's network parameters, the information entered in MEUI 301, and the user input 501 entered in the application(s) NAUI window 500 to configure the application(s) on the WAN topology, shown in the MEUI window 400. The analysis engine 303 produces an estimate of each application's network load usage (WAN utilization), and client network latency delays through the WAN topology. The results, unique to each application, are displayed on the application's network application results window 502 in the NAUI window 500. The global effects from all configured applications are calculated by the analytical engine 303 and displayed in the global results window 403 in the MEUI window 400.

The application client entry window 501 is an input area used to specify the placement of the application's clients on specific network nodes in the WAN topology, and to specify the clients' workload by identifying the average percentage of total clients concurrently transferring traffic on the WAN. The application client entry window 501 has the following four fields.

"WAN Segment Distance" (column 7): This field specifies the physical distance data traffic must travel between nodes connected by the WAN segment. This field has units represented in miles.

"Specified Round Trip Propagation Delay" (column 8): This field allows a user to specify an explicit value for round trip propagation delay. It may be used to supplement or replace the "WAN Segment Distance" (column 7). This field has units represented in milli-seconds. This field is useful when estimating propagation delay through the Internet.

"Local Node Client Count" (Column 9): In this field, the user identifies the total number of clients in the entry fields for the WAN nodes to configure the application on the WAN topology specified in the MEUI window 400.

"Local Node CR" (Column 10): This local node concurrency rate (CR) field specifies the average percentage of total clients, at each node, that are concurrently active. The CR field, at the top of column 8, is not associated with any specific node, and is the CR that applies to all clients, unless otherwise entered in column 8. This global CR value is overridden by entering a value in the Local Node CR field for selected WAN nodes. The % of use field, also at the top of column 8, specifies the average percentage of time clients spend in a specific application. If clients can access other applications, the % of use should be set to modify the CR values for the application.

The networked application results window 502 is used to display analytical data indicating WAN capacity usage and the client's network latency delays through the WAN topology. The networked application results window 502 includes the following eight fields.

"Total WAN Utilization Upstream and Downstream" (%) (Columns 1 and 2): The MEUI global report window 403 provides the data to calculate the values for these fields. These fields show the total WAN utilization produced by all configured NAUIs for the background utilization specified in the MEUI.

"Application's WAN Utilization Upstream and Downstream" (%) (columns 3 and 4): The analytical engine 303 calculates and displays the WAN capacity used by the specific application based on the configured client count, the CR value, and the WAN topology. This calculation permits network analysts to quickly identify an application's WAN usage with the total WAN utilization of all configured applications.

"WAN Status" (text) (Column 5): This field is also provided by the MEUI 301, unless an error in client placement occurs. If an error occurs, the specific NAUI will flag the WAN status with an "ERROR" flag; otherwise, if no error occurs, the specific NAUI will flag the WAN status with an "OK" flag.

"Local Node's Client Concurrency Count" (numeric) (column 11): This field identifies the number of active clients at each node. The analytical engine 303 calculates this value using the client count, the CR value, and the WAN topology information.

"Local Node's Network Latency" (seconds) (column 12): This field shows the client's average network delay that application transactions encounter over the node's upstream WAN connection to the next node.

"Total Network Latency" (seconds) (column 13): This shows the clients total network latency across the WAN topology that defines a client's path to/from the application server (s).

The NEUI 302 of the NLE 116 operates in a functional manner that is similar, but different from, other conventional WAN simulation tools available in the network industry. Most WAN simulation tools require the user to establish the WAN topology. This is also done in the NLE 116 using the MEUI 301, but the process is easier and faster to accomplish with the MEUI 301, because the focus of the NLE 116 is client deployment in a structured WAN topology for application delivery in an application specific provider (ASP) environment, wherein the application servers are centralized in data centers. One area of MEUI 301 that differs from existing network analysis products is the global report window field "Total Concurrent Clients." The analytical engine 303 calculates this value based on information from each pre-configured NAUI 302. The value of this field relates to the effectiveness of networked application to efficiently use WAN bandwidth capacity. Low values reported in the "Total Concurrent Clients" field indicate that one or more of the configured applications may not be properly configured. Too many clients may be allocated to the WAN segment and/or the client workload may be set too high. Hence, the "Total Concurrent Clients" field permits the NLE user to easily detect this possible condition, and then review more detailed information on the application's NAUI 302.

The functional operation of MEUI 301 and analytical engine 303 provide advantages for the NLE 116 over other existing WAN simulation tools used for WAN capacity planning and network latency predictions when deploying new networked applications. With existing tools, the user must define the application's traffic load on the WAN topology for each application. This is accomplished by setting up each of the application's traffic patterns, linking this traffic to clients and servers, and then specifying the workload for each traffic pattern. These traffic patterns are unique to each application and must be imported into the tool as network traffic trace files previously captured when the application was being profiled for its network behavior. The overall effort is very challenging and time consuming. In addition, incorporating a large number of applications into the simulation tool, as a standard set of applications, to allow a user to select and configure multiple applications, to perform a WAN capacity planning study, is not very practical. These existing tools require the user to be an expert network analyst who has the time to do time consuming in-depth network studies. However, the NLE 116 is a more efficient tool that is easy to use, can incorporate a large set of selectable applications, and does not require the user to define each application's network traffic patterns. The NLE 116 does not require expert network analysts. The NLE 116 supports WAN capacity planning of multiple application delivery in the application specific provider (ASP) environment.

The functional operation of NAUI 302 and analytical engine 303 rely on the four metrics, determined in step 202 of FIG. 2. The four metrics are used as input to the NLE 116 when the application's NAUI 302 is defined making it a member of the set of applications. Network analysts preferably perform NAUI definition for NLE 116 revision updates. The metrics are then used by the NLE's analytical engine 303 and are preferably not seen or manipulated by the NLE user. The analytical engine 303 uses these four metrics along with input from the NAUI 302 when a user selects and configures the application for inclusion in a capacity and network latency study.

Figure 6:
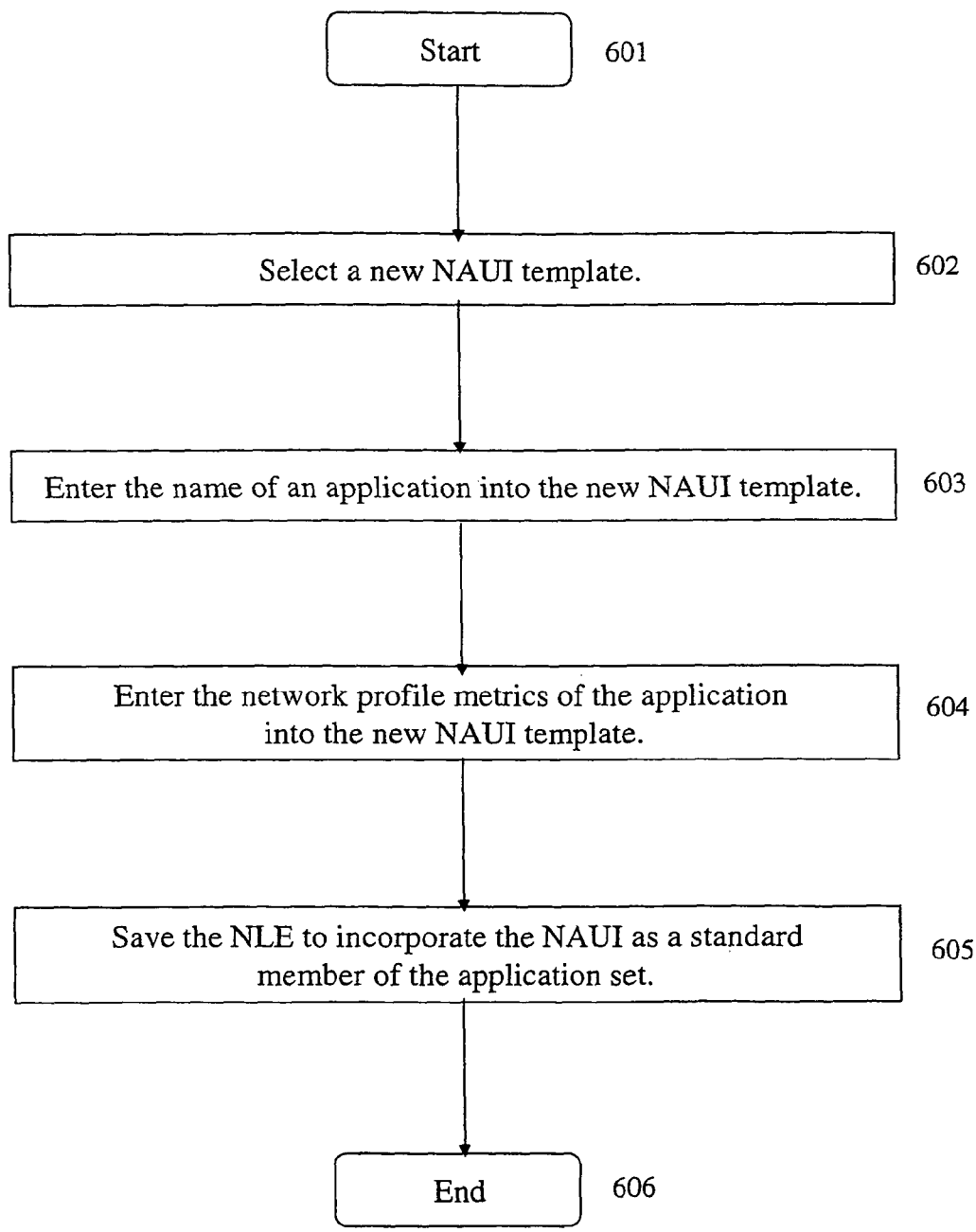
FIG. 6 illustrates a process for defining an application NAUI, as shown in FIGS. 3 and 5, in accordance with a preferred embodiment of the present invention.

FIG. 6 illustrates a process 600 for defining an application NAUI, as shown in FIGS. 3 and 5, in accordance with a preferred embodiment of the present invention. The process 600 generally describes a background step performed by an administrator of the NLE 116 to define an application's NAUI to incorporate into the NLE 116.

At step 601, the process begins.

At step 602, the administrator selects a new NAUI template.

At step 603, the administrator enters the name of the application.

At step 604, the administrator input the application's network profile metrics.

At step 605, the administrator saves the NLE 116 to incorporate the NAUI as a standard member of the application set.

At step 606, the process ends.

Figure 7:
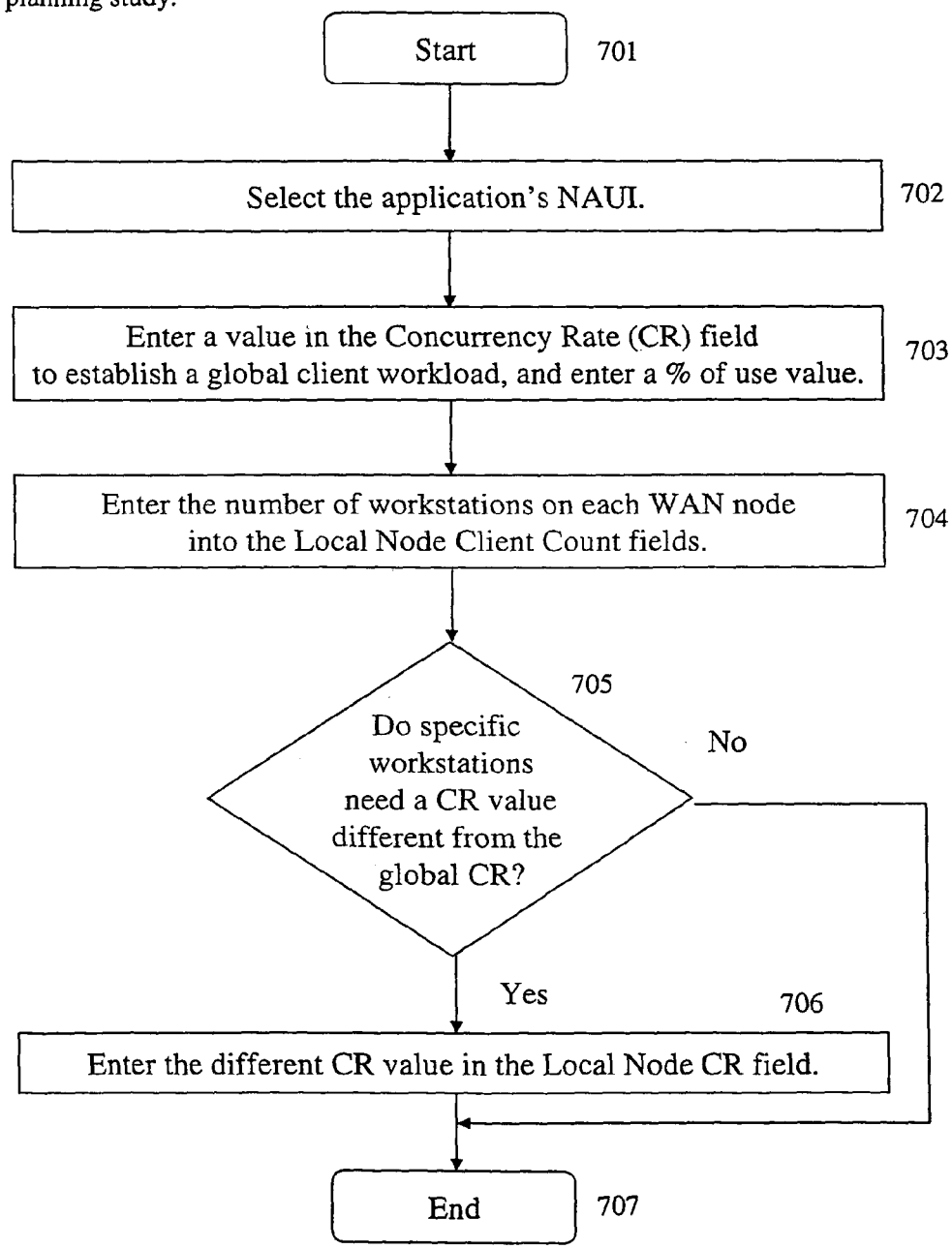
FIG. 7 illustrates a process for configuring an application for a capacity planning study for the NLE of FIG. 3, in accordance with a preferred embodiment of the present invention.

FIG. 7 illustrates a process 700 for configuring an application for a capacity planning study for the NLE 116 of FIG. 3, in accordance with a preferred embodiment of the present invention. The process 700 is also performed by an administrator of the NLE 116.

At step 701, the process begins.

At step 702, the administrator selects the application's NAUI. Preferably, the MEUI is setup before selecting an application's NAUI.

At step 703, the administrator establishes a global client workload by inputting a value in the CR field (top of column 8), and establishes a percentage of use. Normally the user allows the NLE to establish the CR values which specify the workload. However, there may be circumstances were the user needs direct control over the CR. For example, in FIG. 5 the CR value is set to 20%. The CR value specifies the estimated average percentage of total clients that will execute application transactions within one-minute time intervals. This global value only applies to the specific NAUI, since other NAUIs may also be configured have their own CR value. If the clients spend 100% of their time in this application, then the administrator inputs a 100% value in the percentage of use field, also at the top of column 8. Otherwise, the administrator inputs the estimated percentage of use that a typical client spends using the particular application.

At step 704, the administrator enters the number of clients on each WAN node using "Local Node Client Count" fields in column 7 of FIG. 5. For example, FIG. 5 shows the following client count: 10 on node 2, 15 on node 3, 2 on node 4, and 15 on node 5.

At step 705, the administrator determines whether specific clients need a CR (i.e., concurrency rate—workload) value different from the global CR (e.g., 20% in FIG. 5). If the determination at step 702 is positive, then the process continues with step 706; otherwise, if the determination at step 1005 is negative, then the process continues with step 707.

At step 706, the administrator enters the CR value in the field under "Local Node CR" in column 10 of FIG. 5 for the specific client. For example, FIG. 5 shows a CR of 30% for clients on node 2 and 65% for node 4.

At step 707, the process ends. The application is now configured. The analytical engine 303 uses this information and the information from the MEUI 301 to calculate the application network capacity usage and network latency delay.

Figure 8:
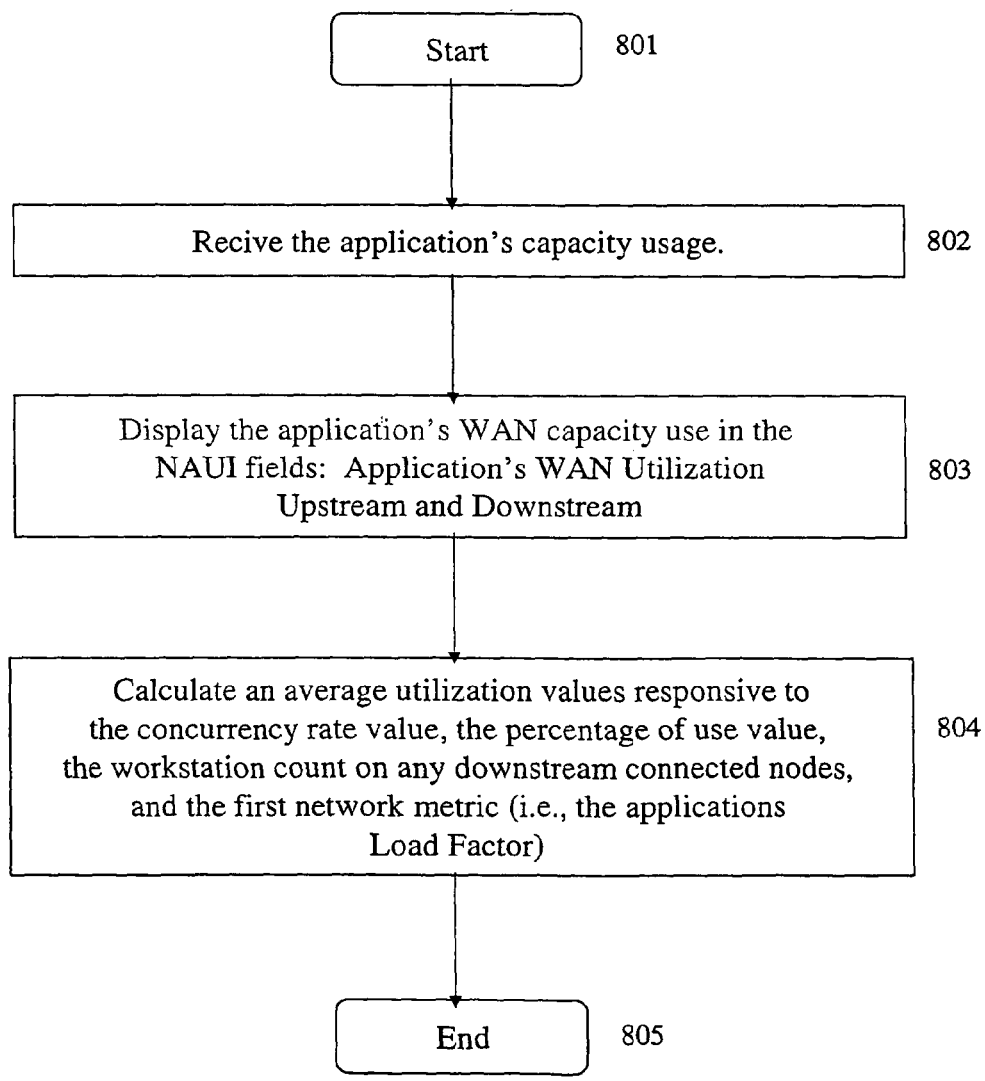
FIG. 8 illustrates a process for reporting analysis results in the MEUI's global results window and in the NAUI's results window by the analytical engine of FIG. 3, in accordance with a preferred embodiment of the present invention.

FIG. 8 illustrates a process 800 for reporting analysis results in the MEUI's global results window 403 in FIG. 4, and in the NAUI's network application results window 502 in FIG. 5 by the analytical engine 303 of FIG. 3, in accordance with a preferred embodiment of the present invention.

At step 801, the process begins.

At step 802, the analytical engine 303 receives the application's capacity usage.

At step 803, the analytical engine 303 displays the application's WAN capacity use in the NAUI 500 fields "Application's WAN Utilization Upstream and Downstream."

At step 804, the analytical engine 303 calculates the average utilization values using the following information: CR, percentage of use, node's client count, client count on any downstream connected nodes as specified on the WAN configuration map 402 in the MEUI 400, and the network metric 1 (i.e., the application's load factor which preferably is not visible to the administrator).

At step 805, the process ends.

Figure 9:
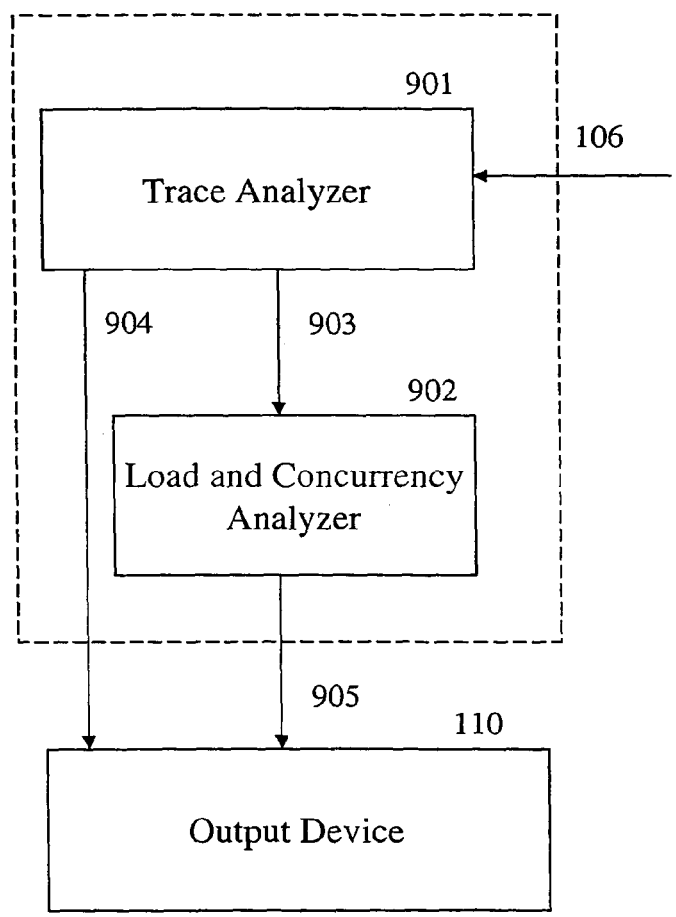
FIG. 9 illustrates a network load analyzer, employed by the server of FIG. 1, in accordance with a preferred embodiment of the present invention.

FIG. 9 illustrates a network load analyzer (NLA) 117, preferably employed by the server 101 of FIG. 1, in accordance with a preferred embodiment of the present invention. The NLA 117 generally includes a trace analyzer 901 and a load and concurrency analyzer 902, each preferably being implemented in the processor 109 of the server 101. The trace analyzer 901 is electrically coupled to the clients 102, 103, and 104 via the communication path 106. Each of the trace analyzer 901 and the load and concurrency analyzer 902 are electrically coupled to the output device 110 via connections 904 and 905, respectively. The trace analyzer 301 communicates with the load and concurrency analyzer 302 via connection 903, which is preferably internal to the processor 109.

Network sniffer trace files ("trace files") provide external input to the NLA 116 via the communication path 106 to capture an application's client/server network traffic conversations, preferably, in a real time, production environment. Preferably, the trace files are imported into the trace analyzer by a trace file input element (not shown). Each trace file contains a set of records where each record contains information on a unit of data (e.g., a network frame) that flows over the network 100 between a sender (e.g., the server 101 or the client 102-104) and a receiver (e.g., the client 102-104 or the server 101). The trace file input element also parses and converts the trace file to the format required by the trace analyzer 901. Preferably, each trace file contains thousands of records. A preferred record format includes the following four fields:

Field 1: Relative Time Stamp—Time when the network frame was captured on the network.

Field 2: Sender ID—Network address Internet Protocol (IP) address.

Field 3: Receiver ID—Network address Internet Protocol (IP) address.

Field 4: Size of the Network Data Frame—Bytes.

The trace analyzer 901 processes each of the trace files based on user control settings. Each trace file is processed separately and each trace file has one output file, which is passed to the load and concurrency analyzer 902, via connection 903. Preferably, each trace file contains captured network traffic for at least a ten (10) minute time interval for proper analysis. The output file(s) provide network loading and user workstation concurrency metrics used by the load and concurrency analyzer 902.

The load and concurrency analyzer 902 permits a user/analyst to display the raw data from the trace analyzer output trace files and/or calculate an overall average from all output trace files. The information is presented in the summary results window 308, shown in FIG. 3. The load and concurrency analyzer 902 summarizes all the information and displays, via the output device 110, the statistical results showing the average network load used by a single client, and the average number of concurrent clients within specified time intervals, which are preferably one (1) minute, but may be other user selectable time intervals. The client's network load value specifies the average network capacity used when an application's user client is working with the application. The client's network load value is a first metric that has particular value when the user client is communicating with the server 101 over a WAN. Preferably, the WAN has a predetermined threshold capacity that should not be exceeded to properly support anticipated application response time for the user. Preferably, the predetermined threshold is set at seventy percent (70%) of the WAN's total capacity. For example, if an application has a client network load value of five percent (5%) on a specific WAN, then fourteen (14) concurrent clients will load the WAN at the predetermined threshold. The equation that represents this example is: Number of Concurrent Clients=WAN Threshold/Client Network Load value.

A second metric produced by the load & concurrency analyzer 902 is the application's client concurrency rate, which is a ratio of clients transferring data in specified time intervals, preferably one (1) minute intervals, but may be other user selectable time intervals, to a total number of active clients logged on the application's server(s) 101. For example, if the NLA 117 shows that an application used over the production network 100 has an average of one hundred (100) clients logged on, and the client concurrency per one (1) minute time interval is fourteen (14), then one hundred (100) clients can be supported on a WAN when the client network load value is five percent (5%). The equation that represents this example is: Client Concurrency rate=Client Concurrency/Number of Clients Logged-In. Hence, this information aids in WAN capacity planning and validates other tools/ analysis used to establish an application's network profile before production delivery.

Figure 10:
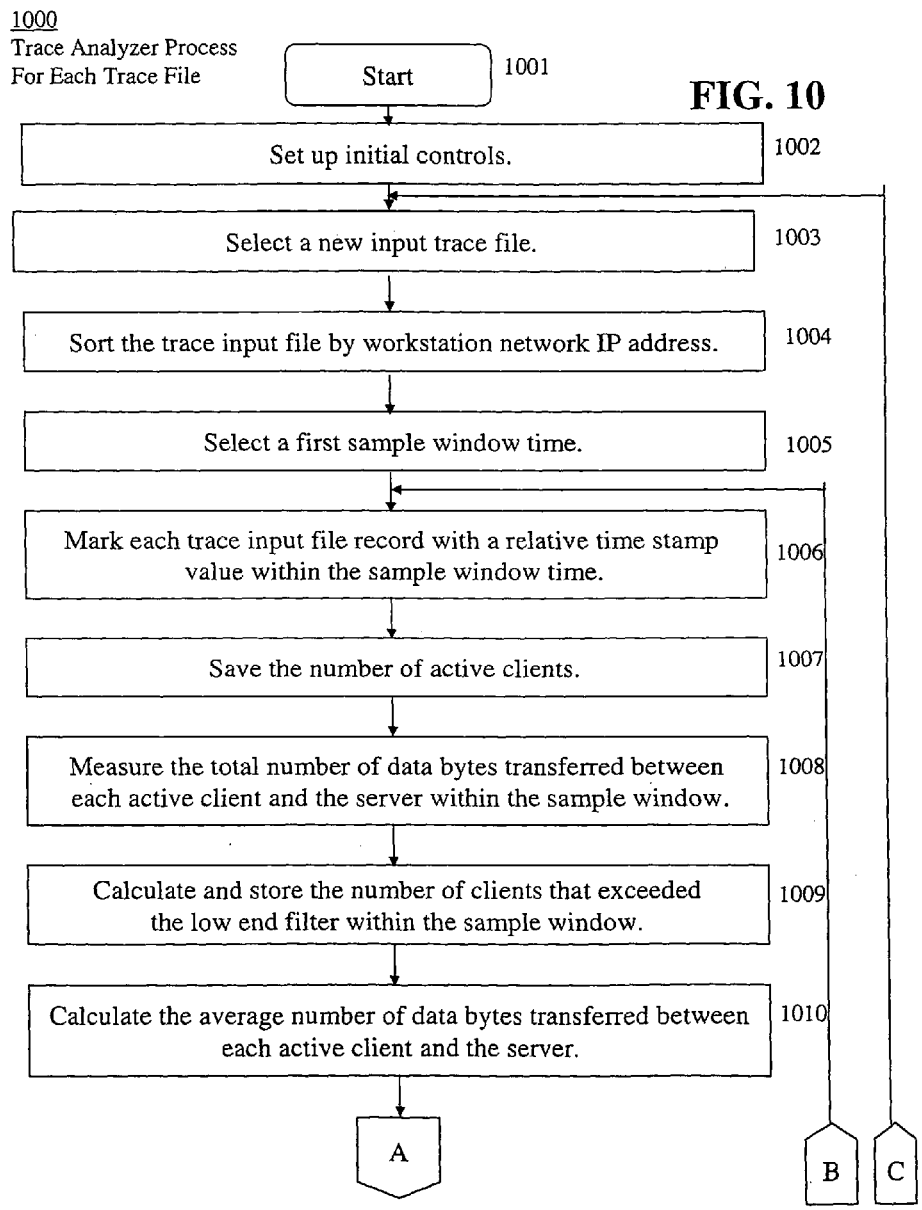
FIG. 10 illustrates a trace analyzer process for each trace file, performed by the trace analyzer of FIG. 9, in accordance with a preferred embodiment of the present invention.
Figure 10:
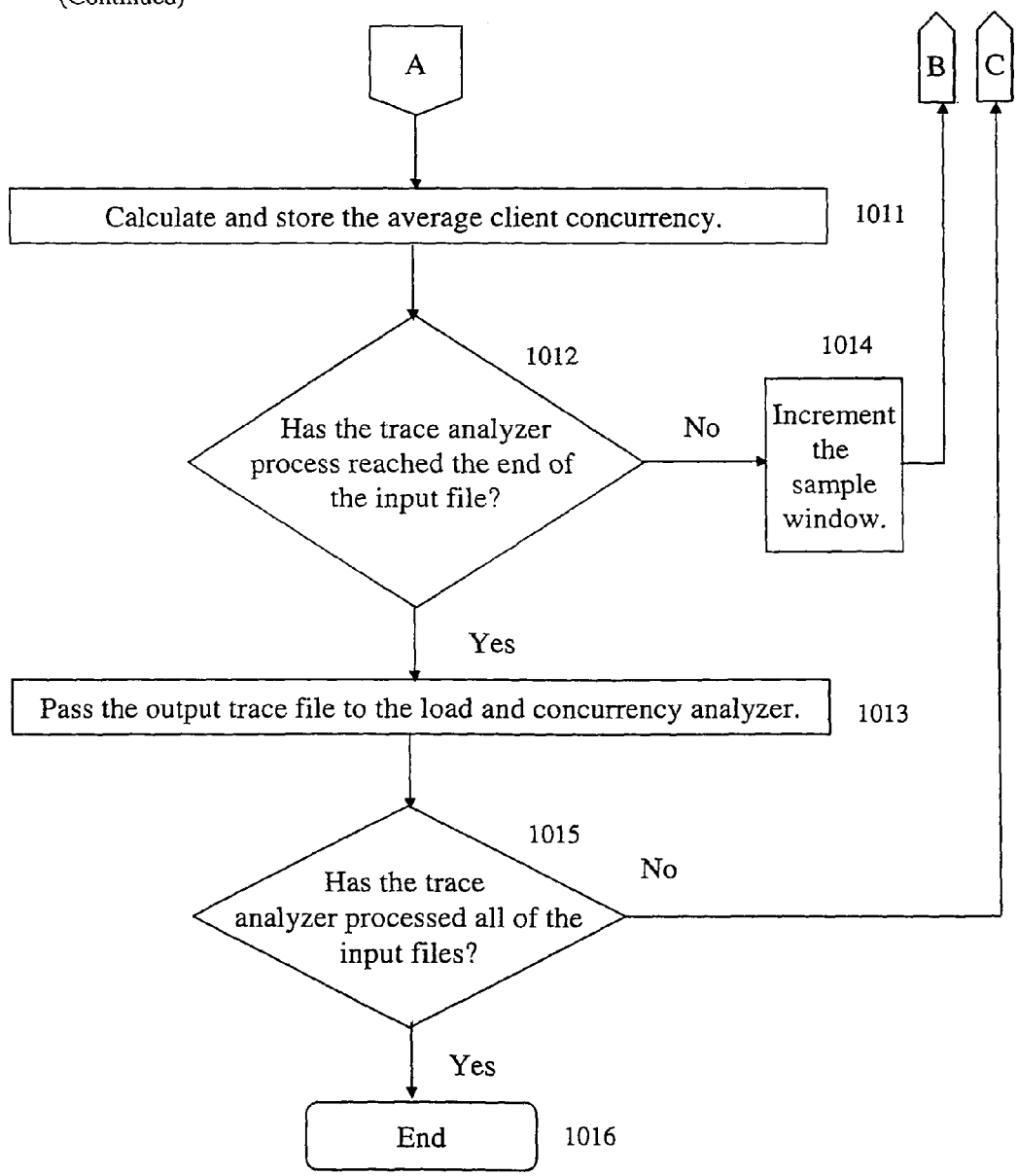

FIG. 10 illustrates a trace analyzer process 1000 for each trace file, performed by the trace analyzer 901 of FIG. 9, in accordance with a preferred embodiment of the present invention. Preferably, each trace file is analyzed separately and in sequential order.

At step 1001, the process 1000, otherwise called a method, begins.

At step 1002, the trace analyzer 901 initializes four controls as follows.

1. Sample Interval time: default value 60 seconds. This value controls the size of the time sample for each measurement.

2. Server(s) identification (ID): This ID identifies the Network IP address(es) that belong to the application server(s). All other Network IP addresses belong to user clients.

3. Low-end Byte Filter: This filter is used to separate clients that are sending small amount of data in the sample window. This type of data traffic may represent keep-alives or the tail-end traffic of the previous sample window or front-end traffic just before the start of the next sample window. This low-end traffic indicates that these clients are in session (logged-in) with the application's server 101.

4. High-end Byte Filter: (default mode is off) If an application has some clients that transfer large blocks of data traffic over the network 100 (i.e., high end clients), these clients can be isolated from the standard clients to avoid skewing the analysis. Preferably, clients transferring data, in any sample window, which exceeds the high-end filter is eliminated from analysis. To analyze only the high-end clients, turn off the high-end filter and set the low-end filter to the value used in the high-end filter to isolate the analysis of these high-end clients.

At step 1003, the trace analyzer 901 starts the analysis process by selecting a trace file for analysis, responsive to receiving the required trace files and initializing the four controls.

At step 1004, the trace analyzer 901 sorts the trace file by client network IP address. Preferably, the sorting is performed based on the client's IP address.

At step 1005, the trace analyzer 901 selects the first sample window time (e.g., the default is 0 to 60 seconds).

At step 1006, the trace analyzer 901 marks as active each file record with a relative time stamp value within the sample window time. Each record corresponding to the same client IP address is given same numerical value. The values start at one and are sequenced until all clients in the window are marked active.

At step 1007, the trace analyzer 901 saves the number of active clients. This step identifies the total number of active clients within the specified sample window. This step is necessary to prepare for step 1009.

At step 1008, the trace analyzer 901 measures, for each active client, the total number of data bytes transferred by each active client within the sample window. Two values are calculated as follows: 1) bytes from client to server, and 2) bytes from server to client. If the sum of these two values exceeds the low-end, the trace analyzer 901 saves the data byte values and marks the client as a true concurrent client.

At step 1009, the trace analyzer 901 calculates and stores the number of clients that exceeded the low-end filter within the sample window. Only these clients are truly communicating with the application server in the present sample window. This step provides the true value for concurrent clients and is used in step 1010.

At step 1010, the trace analyzer 901 calculates the average number of data bytes transferred per clients (i.e., average workstation byte count). Two values are calculated and stored as follows: 1) client (i.e., workstation) to server, and 2) server to client (i.e., workstation).

At step 1011, the trace analyzer 901 calculates the average workstation concurrency by taking the ratio of the number of communicating workstations (determined in step 1009) to the total number of active workstations (determined in step 1007). This information is stored in the output file, wherein one output file corresponds to each input trace file.

At step 1012, the trace analyzer 901 determines whether the trace analyzer 901 has reached the end of the trace file. If the trace analyzer 901 determines that the end of the trace file has been reached, then the process continues to step 1013; otherwise, the process continues to step 1014.

At step 1013, the trace analyzer 901 passes the trace file to the load & concurrency analyzer 902, via connection 903.

At step 1014, the trace analyzer 901 increments the sample window time (e.g., 60 seconds) and the process returns to step 1006 to repeat the process for a new sample window time.

At step 1015, the trace analyzer 901 determines whether all of the trace files have been processed. If the trace analyzer 116 determines that all of the trace files have been processed, then the process continues to step 1016; otherwise, the process returns to step 1003, wherein a new trace file is selected for processing.

At step 1016, the process ends.

FIG. 11 illustrates a single output trace file display 1100, provided by the trace analyzer 901 of FIG. 9, in accordance with a preferred embodiment of the present invention. An analyst selects this display mode by identifying a specific output trace file. The single output trace file display 1100 is displayed using the output device 110, as shown in FIGS. 1 and 9. The single output trace file display 1100 generally includes five sub-windows, otherwise called displays, tables, sections, areas, and the like, including an input area window 1101, a base metrics window 1102, an output control summary window 1103, a WAN load metrics window 1104, and an output file record window 1105.

The input area window 1101 includes an output trace file ID field, a confidence level field (%) (noted as Input 1), and a WAN speed field (noted as Input 2). Preferably, the confidence level value is set to a default of 95%. The confidence level value controls the statistical calculations with respect to the degree of variance in the measurements contained in the output trace file records. The analyst may change this value. The WAN speed value is set to a default of 128 kbits per second. The analyst may also change this value to analyze the load metrics for other WAN speeds.

The base metrics window 1102 includes a concurrent clients (in dialog) field, an average active clients field, an average concurrency rate (CR) % versus active clients field, an average bytes from the client (i.e., workstation) to the server 101 field, and an average bytes from the server 101 to the client (i.e., workstation).

The output control summary window 1103 includes a sample time interval field, a number of samples field, a low-end filter field, and a high-end filter field. These are the control settings used when the trace analyzer 901 processes the input trace file.

The WAN load metrics window 1104 includes a WAN speed field, statistical data fields for the client (i.e., workstation) to server 101, and statistical data fields for the server 101 to client (i.e., workstation) to server 101. Three statistical mean fields for each communication traffic direction include a load factor (LF) % field, a concurrency factor (CF) field, and a standard deviation (STD). Two statistical mean at confidence level fields for each communication traffic direction include a load factor (LF) %, and a concurrency factor (CF) field. The WAN load metrics window 1104 displays the statistical average over all of the records in the output trace file displayed in the output file record window 1105.

The output file record window 1105 displays one output file for each input trace file and one record for each sample window time. Preferably, the sample window time is one minute by default, and an input trace file covers at least a ten (10) minutes duration (i.e., ten sample windows). The output file record window 1105 has a record format including the following six fields:

Field 1: sample window time.
Field 2: total number of active clients.
Field 3: number of clients in dialog.
Field 4: average data bytes client to server.
Field 5: average data bytes server to client.
Field 6: client concurrency rate.

When a value is set for WAN speed (Input 2 in input area window 1101), the trace analyzer 901 calculates the average WAN capacity (WAN bandwidth) used by a single application client in both the client to server direction and the server to client direction. The raw data comes from field 4 and field 5 in the output file record window 1105.

The trace analyzer 901 computes the average value for data bytes client to server and data bytes server to client. The trace analyzer 901 also calculates the standard deviation, which is used when adjusting the averages to the specified confidence level. The two averages are divided by the sample interval time to specify the average bytes transferred per second. This value is divided by the WAN speed expressed in bytes per second. This last value is multiplied by 100% to determine a value called the client load factor (LF). The client load factor specifies the average amount of WAN capacity used when an application client is busy executing application tasks.

Dividing the WAN threshold capacity by the LF normalizes the LF. This value is called the concurrency factor (CF). For example: if the client's LF is 5% and the WAN's threshold capacity is 70%, the CF is 14. This means that fourteen concurrently active clients will consume the WAN threshold. It also means that the WAN can support 14 work hours in a one-hour time interval. The CF is a useful metric for evaluating an application's use of WAN networks. Since the NLA 117 is used to evaluate an application in a production environment, the CF reveals the true or actual network load characteristics. This information can then be used to validate other analytical tools used to profile applications before making the application generally available (GA). This feedback is advantageous for proper engineering practice in network configuration.

FIG. 12 illustrates a complete output trace file summary display 1200, provided by the load and concurrency analyzer 902 of FIG. 9, in accordance with a preferred embodiment of the present invention. The display 1200 allows a more in-depth analysis by combining all output trace files to obtain a more accurate value for the application CF value. The display 1200 includes an input window 1201, an output trace file summary window 1202, and an output window 1203.

The input window 1201 includes:
Input 1—WAN speed. Preferably, the WAN speed is a required input, for example, 128 Kbit per second WAN.
Input 2—WAN threshold capacity. The WAN threshold capacity is automatically set to a recommended value, for example, a value of 60% for the 128K WAN, but the value may be changed.

Input 3—confidence level. Preferably, the default value for the confidence level is 95%, but may also be changed. The confidence level affects the value of the calculated CF in the output window 1203.

The output trace file summary window 1202 includes an output trace file ID field, a sample time field, an enable field, a concurrent clients field, a concurrency rate field, a load factor (LF) client (i.e., workstation) to server field, and a LF server to client (i.e., workstation) field. Each row corresponds to an output trace file and displays the average value of all the sample windows in the file. The window 1202 only shows twelve files, but the window 1202 can be preferably scrolled to display up to eighty or more files. The load and concurrency analyzer 302 uses these averages to calculate an overall average, which is displayed in the output window 1203. The analyst can remove any particular output trace file from the calculation, if the analyst believes that the data from the file compromises the overall average values. For example, the window 1202 shows the removal of output trace files for 12:00 pm and 12:30 pm.

The output window 1203 includes a concurrent clients (i.e. workstations) field, a concurrency rate (CR) field, a load factor (LF) client (i.e., workstation) to server field, a load factor (LF) server to client (i.e., workstation) field, a concurrency factor (CF) client (i.e., workstation) to server field, and a concurrency factor (CF) server to client (i.e., workstation) field. The window 1203 displays the final output metrics for the application: concurrency rate (CR), load factor (LF), and concurrency factor (CF). The CF value is controlled by the value of the LF, the confidence level, and WAN speed. A higher value of CF corresponds to a better use of the WAN for the application. For example, the window 1203 shows a CF value of 7.76 for a 128K WAN speed, in the direction of server to client (i.e., workstation), with a 95% Confidence Level. The window 1203 also shows that the average number of concurrent clients (i.e., workstations) is 10.4 and the CR is 4.9%. This indicates that the total number of clients logged-in was 212 (i.e., 4.9%×212=10.4). However, the 128K WAN with a CF value of 7.76 can only support 7.76 concurrent clients. With a concurrency rate of 4.9%, the maximum number of logged-in clients is 158.

In summary of the preferred embodiment of the present invention, the network guidelines estimator (NGE) 115 estimates network load metrics for each software application 112 operating in a simulate network to determine network load metrics for each software application 112.

The network load estimator (NLE) 116 estimates a network load for one or more software applications concurrently operating in a network responsive to the network load metrics of each software application. The NLE 116 provides an easy to use network simulation tool used to size the network capacity and network latency of WANs for a large number of networked applications. Users of the NLE 116 do not need any particular knowledge or experience with complex network simulation tools that require hours to setup and run. The user interface is straightforward and easily understood. Analysis results are performed in minutes instead of hours. Performance issues are presented in real-time allowing a user to make fast decisions and changes to sizing the WAN for proper performance. Hence, the NLE 116 permits quick and reliable sizing of WANs when deploying one or more applications simultaneously.

The NLA 117 receives input from network sniffer trace files that contain captured data traffic generated by workstations executing an application in a preferably live production environment. The NLA 117 is then used to digest one or more trace files (each file preferably having fifteen minutes of traffic activity) to produce the application's network capacity profile. The NLA 117 performs analysis of the trace file data, filtered in each sample time window (preferably 60 seconds intervals). Each time window shows the total traffic load, the total number of clients producing traffic, the average traffic load per client (average WAN bandwidth per client), and the client concurrency rate (client workload). All window measurement over all trace files are averaged using mean, variance and confidence level to establish the application's capacity profile metrics: 1) Client Load Factor (i.e., bandwidth usage) and 2) Client Concurrency Rate (i.e., workload). These two metrics are used to validate metrics estimated by the NGE 115 that is used to profile the application 112 before general availability release. Since NLA application analysis is preferably made using traffic from a live application, the NLA metrics provide an accurate and easy method to size a WAN when adding new clients 102-104 to the application 112. The NLA metrics are then used to tune the NLE 116 and/or the NGE 115.

Hence, while the present invention has been described with reference to various illustrative embodiments thereof, the present invention is not intended that the invention be limited to these specific embodiments. Those skilled in the art will recognize that variations, modifications, and combinations of the disclosed subject matter can be made without departing from the spirit and scope of the invention as set forth in the appended claims.

What is claimed is:

1. A system enabling estimating network load impact of an executable application, comprising:
    data representing network load metrics associated with an individual executable software application and usable in estimating a network load representative value for said software application operating in a network, said network load metrics being provided by a network guidelines estimator for estimating a network load for an individual software application operating in a test network;
    an individual executable software application associated with said data representing network load metrics; and
    a network load estimator comprising at least one processing device for estimating a network load for a plurality of software applications including said individual executable software application concurrently operating in a non-test network responsive to the network load metrics of individual applications of said plurality of software applications.

2. A system according to claim 1, wherein the network guidelines estimator provides network load metrics for said plurality of software applications.

3. A system according to claim 2, wherein a distributor of the software application initiates performance of the estimate by the network guidelines estimator.

4. A system according to claim 2, wherein a manufacturer of the software application initiates performance of the estimate by the network guidelines estimator.

5. A system according to claim 1, wherein the network load metrics for an individual software application are provided with the software application to a buyer when purchased from a seller of the software application.

6. A system according to claim 1 further comprising:
    a network load analyzer for determining an actual network load for a plurality of software applications concurrently operating in a production network.

7. A system according to claim 6 wherein the network load determined by at least one of, the network guidelines estimator and the network load estimator, is modified responsive to the actual network load determined by the network load analyzer.

8. A network guidelines estimator comprising:
    at least one processing device for estimating a network load for an individual software application operating in a network to determine network load metrics for an individual software application, wherein the network load metrics are used by a network load estimator for estimating a network load for a plurality of software applications concurrently operating in a network responsive to the network load metrics of individual software applications.

9. A network load estimator comprising:
    at least one processing device for estimating a network capacity for a plurality of software applications concurrently operating in a network responsive to predetermined network load metrics of individual software applications, wherein the predetermined network load metrics represent a network load for individual software applications operating in a network.

10. A computer executable product comprising a non-transitory computer readable medium including an executable application and supporting estimating a network load impact, comprising:
    an individual executable application operable in a network; and
    accompanying data representing network load metrics associated with said individual executable application and provided with said executable application and usable in estimating a network load representative value for said application operating in a network, said network load metrics being provided by a network guidelines estimator for estimating a network load for an individual software application operating in a test network, said network load metrics being usable by a network load estimator for estimating a network load for said individual executable application when concurrently operating in a non-test network together with a plurality of software applications.

11. A computer executable product according to claim 10, wherein
    said network guidelines estimator provides for said individual executable application, at least one of, (a) a concurrency factor, (b) base workload and (c) a workload completion time, for use by a network load, for use by said network load estimator together with said network load metrics in estimating said network load for said individual executable application.

12. A computer executable product according to claim 10, wherein said network load metrics comprise at least one of: (a) an estimated average number of bytes transferred in a time interval using said application, (b) an estimated maximum number of bytes transferred in a time interval using said application, (c) an estimated minimum number of bytes transferred in a time interval using said application, (d) a client's average network load factor, (e) an average data packet size, (f) an average number of request/response pairs in an application transaction, and (g) an average number of bytes transferred between a client and at least one server when executing an application transaction.

13. A computer executable product according to claim 12, wherein said average number comprises at least one of, (a) median, (b) arithmetic mean and (c) arithmetic mean adjusted in response to a confidence level.

* * * * *